(12) United States Patent
Wekwert et al.

(10) Patent No.: US 12,145,189 B2
(45) Date of Patent: Nov. 19, 2024

(54) TUBING EXPANSION TOOLS AND SYSTEMS AND METHODS FOR LEAK DETECTION

(71) Applicant: MILWAUKEE ELECTRIC TOOL CORPORATION, Brookfield, WI (US)

(72) Inventors: James Wekwert, Wauwatosa, WI (US); Jeremy R. Ebner, East Troy, WI (US); Troy C. Thorson, Cedarburg, WI (US); Zachary G. Stanke, Wausau, WI (US); Gareth Mueckl, Milwaukee, WI (US); Alex H. Boll, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 781 days.

(21) Appl. No.: 17/046,180

(22) PCT Filed: May 27, 2020

(86) PCT No.: PCT/US2020/034733
§ 371 (c)(1),
(2) Date: Oct. 8, 2020

(87) PCT Pub. No.: WO2020/243191
PCT Pub. Date: Dec. 3, 2020

(65) Prior Publication Data
US 2022/0184685 A1 Jun. 16, 2022

Related U.S. Application Data

(60) Provisional application No. 62/923,964, filed on Oct. 21, 2019, provisional application No. 62/861,361, (Continued)

(51) Int. Cl.
*B29C 57/00* (2006.01)
*B21D 41/02* (2006.01)
*B29C 57/06* (2006.01)

(52) U.S. Cl.
CPC ............ *B21D 41/028* (2013.01); *B29C 57/06* (2013.01)

(58) Field of Classification Search
CPC ......... B29C 57/00; B29C 57/02; B29C 57/04; B29C 57/06
See application file for complete search history.

(56) References Cited

U.S. PATENT DOCUMENTS 3,728,059 A * 4/1973 de Putter .............. B29C 57/045
425/393
4,107,249 A * 8/1978 Murai ................... B29C 57/045
264/296
(Continued)

FOREIGN PATENT DOCUMENTS

| CN | 105057764 A | 11/2015 |
| JP | 2000271677 A | 10/2000 |

(Continued)

OTHER PUBLICATIONS

International Search Report and Written Opinion for Application No. PCT/US2020/034733 dated Sep. 25, 2020 (10 pages).
(Continued)

*Primary Examiner* — Thu Khanh T. Nguyen
(74) *Attorney, Agent, or Firm* — Michael Best & Friedrich LLP

(57) ABSTRACT

A working element operable to expand an end of a tube includes a main body configured to rotate about an axis, a plurality of roller supports movably coupled to the main body, the roller supports movable relative to the main body between a retracted position and an expanded position, and a plurality of rollers coupled to the roller supports such that a distance between a first roller of the plurality of rollers and a second roller of the plurality of rollers increases when the roller supports move toward the expanded position. The rollers are configured to be inserted into the end of the tube when the roller supports are in the retracted position, and the rollers are engageable with an inner circumference of the tube when the main body rotates about the axis to expand the end of the tube.

18 Claims, 20 Drawing Sheets

Related U.S. Application Data filed on Jun. 14, 2019, provisional application No. 62/855,044, filed on May 31, 2019, provisional application No. 62/855,386, filed on May 31, 2019.

(56) References Cited

U.S. PATENT DOCUMENTS

| | | | |
|---|---|---|---|
| 8,641,407 B2 * | 2/2014 | Simpson | B21D 39/08 425/387.1 |
| 2005/0145001 A1 * | 7/2005 | Lamb | B21D 22/16 72/125 |
| 2010/0008731 A1 | 1/2010 | Kakine et al. | |
| 2019/0299264 A1 * | 10/2019 | Yoo | B21B 23/00 |

FOREIGN PATENT DOCUMENTS

| | | | | |
|---|---|---|---|---|
| KR | 101167711 B1 | 7/2012 | | |
| KR | 101703089 B1 | 2/2017 | | |
| WO | WO-2017135621 A2 * | 8/2017 | | B21D 39/04 |

OTHER PUBLICATIONS

Extended European Search Report for Application No. 20815534.1 dated Sep. 22, 2023 (7 pages).

* cited by examiner

TUBING EXPANSION TOOLS AND SYSTEMS AND METHODS FOR LEAK DETECTION

CROSS-REFERENCE TO RELATED APPLICATIONS

This application is a national phase filing under 35 U.S.C. 371 of International Application No. PCT/US2020/034733, filed May 27, 2020, which claims priority to U.S. Provisional Patent Application No. 62/923,964, filed Oct. 21, 2019, U.S. Provisional Patent Application No. 62/861,361, filed Jun. 14, 2019, U.S. Provisional Patent Application No. 62/855,044, filed May 31, 2019, and U.S. Provisional Patent Application No. 62/855,386, filed May 31, 2019, the entire contents of all of which are incorporated herein by reference.

FIELD OF THE INVENTION

The present disclosure relates to pipe and tubing expansion tools and more particularly to PEX (cross-linked polyethylene) expansion tools. The present disclosure further relates to systems and methods for identifying and sealing leaks in a PEX tubing system.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

Given an adequate amount of time, the PEX tube will seal around the fitting, forming an air-tight connection. At locations where the PEX tube has elastically recovered, it is common practice to use a heat gun on each connection to reduce the time required for each connection to effectively seal. A problem associated with this practice is that a user must use the heat gun on each connection, regardless of whether the connection is leaking or if the connection has already sealed.

SUMMARY OF THE INVENTION

In some embodiments, a working element operable to expand an end of a tube includes a main body configured to rotate about an axis, a plurality of roller supports movably coupled to the main body, the roller supports movable relative to the main body between a retracted position and an expanded position, and a plurality of rollers coupled to the roller supports such that a distance between a first roller of the plurality of rollers and a second roller of the plurality of rollers increases when the roller supports move toward the expanded position. The rollers are configured to be inserted into the end of the tube when the roller supports are in the retracted position, and the rollers are engageable with an inner circumference of the tube when the main body rotates about the axis to expand the end of the tube.

In some embodiments, a working element operable to expand an end of a tube includes a drive shaft, a main body coupled for co-rotation with the drive shaft, and a plurality of arms movably coupled to the main body. The arms are configured to move from a retracted position toward an expanded position in response to rotation of the drive shaft and the main body. The working element also includes a plurality of rollers supported by the arms. The rollers are engageable with an inner circumference of the tube to expand the end of the tube when the arms move toward the expanded position.

In some embodiments, a working element operable to expand an end of a tube includes a main body, a first support and a second support movably coupled to the main body for movement between a retracted position and an expanded position, a first roller coupled to the first support and a second roller coupled to the second support. The first roller and the second roller are configured to be inserted into the end of the tube when the first and second supports are in the retracted position, and the first support and the second support are movable to the expanded position while the first roller and the second roller are inserted into the end of the tube to engage the first roller and the second roller with an inner circumference of the tube. The main body is configured to rotate when the first roller and the second roller are engaged with the inner circumference of the tube to expand the end of the tube.

In some embodiments, a method of identifying a leak around a fitting in a tubing system includes connecting a source of heated air to an inlet of the tubing system, inspecting segments of the tubing system using a thermal detector, identifying segments of the tubing system that are warmer than other segments of the tubing system, and following the warmer segments of the tubing system to identify the leak around the fitting.

In some embodiments, a method of sealing a leak around a fitting in a tubing system includes connecting a source of heated air to an inlet of the tubing system, pumping the heated air into the tubing system, increasing a temperature of an end of a tubing segment surrounding the fitting as a result of the heated air leaking around the fitting, and by increasing the temperature, causing the end of the tubing segment to contract around the fitting and seal the leak.

In some embodiments, a system for testing pressure in a tubing system includes an air input, a valve, a system pressure sensor, and an air output. The air input is coupleable to an external air compressor. The air output is coupleable to an input of an external tubing system. The valve is coupled to the air input and the system pressure sensor. The system pressure tester is also coupled to the air output. When the valve is open, air can flow from the air input through the valve, the system pressure sensor, and the air output to pressurize the tubing system. A controller is connected to the valve and the system pressure sensor. The controller has an electronic processor coupled to a memory. The memory stores a program that when executed by the electronic processor configures the controller to open the valve to receive air via the air input to pressurize the tubing system and closes the valve when the tubing system is pressurized. The controller reads system pressure values from the system pressure sensor over time and determines whether the tubing system is sealed or leaking air based on the system pressure values over time. The controller provides an indication of the determination.

In some embodiments, the electronic processor determines when the tubing system is pressurized based on time passage, a measured system pressure level, or both. In some embodiments, the indication of the determination also includes a confidence level of the determination. In some embodiments, the indication is selected from the group of confidently sealed, confidently leaking, and uncertain (e.g., sealed with low confidence or leaking with low confidence)

In some systems, one or more temperature sensor is coupled to the electronic processor, and the controller is further configured to read ambient temperature values from the one or more temperature sensors. In some embodiments, the determining of whether the tubing system is sealed or leaking air based on the system pressure values over time is also based on corrections to the system pressure values. The corrections to the system pressure values are based on the system pressure values and the ambient temperature values.

In some embodiments, the pressure sensor may be a gage pressure sensor and the system also includes an atmospheric pressure sensor. The electronic processor is configured to read ambient pressure values from the atmospheric pressure sensor. In some embodiments, the determining of whether the tubing system is sealed or leaking air based on the system pressure values over time is also based on corrections to the system pressure values. The corrections to the system pressure values are based on the system pressure values, the ambient temperature values, and the ambient pressure values.

In some embodiments, a method for testing pressure in a tubing system includes opening, by a controller, a valve to receive air via an air input coupled to the valve. The controller includes an electronic processor and a memory that stores a program that when executed by the electronic processor configures the controller to open the valve. The valve is also coupled to a pressure sensor. When the valve is open, air can flow from the air input through the valve, the system pressure sensor, and an air output that is coupleable to a tubing system to pressurize the tubing system. The valve is closed by the controller when the tubing system is pressurized. The controller reads system pressure values from the pressure sensor over time and determines whether the tubing system is sealed or leaking air based on the system pressure values over time. The controller provides an indication of the determination.

In some embodiments, the electronic processor determines when the tubing system is pressurized based on time passage, a measured system pressure level, or both. In some embodiments, the indication of the determination also includes a confidence level of the determination. In some embodiments, the indication is selected from the group of confidently sealed, confidently leaking, and uncertain (e.g., sealed with low confidence or leaking with low confidence)

In some embodiments, the controller reads ambient temperature values from a temperature sensor coupled to the electronic processor. In some embodiments, the determining of whether the tubing system is sealed or leaking air based on the system pressure values over time is also based on corrections to the system pressure values. The corrections to the system pressure values are based on the system pressure values and the ambient temperature values.

In some embodiments, the controller reads ambient pressure values from an atmospheric pressure sensor that is coupled to the electronic processor. The system pressure sensor may be a gage pressure sensor. In some embodiments, the determining of whether the tubing system is sealed or leaking air based on the system pressure values over time is also based on corrections to the system pressure values. The corrections to the system pressure values are based on the system pressure values, the ambient temperature values, and the ambient pressure values.

In some embodiments, a method is provided for testing pressure in a tubing system. The method includes opening, by an electronic controller, a valve coupled to an air input, where the air input is coupled to a source of compressed air. Air is received through the air input and the open valve. The electronic controller closes the valve when a specified criteria is met. The electronic controller receives pressure level data from a pressure sensor, where the pressure sensor is coupled between the valve and an air output. Air can flow from the air input to the pressure sensor and through the air output when the valve is open. The electronic controller determines a pressure level value for a tubing system coupled to the air output and determines whether the tubing system coupled to the air output is sealed or leaking air based on the pressure level.

In some embodiments, air received via the air input and the open valve exits the air output to the tubing system to pressurize the tubing system.

In some embodiments, the pressure level data received from the pressure sensor includes multiple pressure level measurements over a time period and the determination of whether the tubing system attached to the air output is sealed or leaking air is based on the multiple pressure level measurements over the time period.

In some embodiments, the determination of whether a tubing system attached to the air output is sealed or leaking air is based on time passage, a measured pressure level, or both.

In some embodiments, the controller is further configured to indicate results of the determination of whether the tubing system attached to the air output is sealed or leaking air via a user interface.

In some embodiments, the controller is further configured to indicate results of the determination of whether the tubing system attached to the air output is sealed or leaking air via a communication interface to a user device.

In some embodiments, the controller is further configured to indicate results of the determination of whether a tubing system attached to the air output is sealed or leaking air along with a confidence level for the determination.

In some embodiments, the confidence level is selected from the group consisting of confidently sealed, confidently leaking, and uncertain.

In some embodiments, the controller is further connected to a temperature sensor and reads ambient temperature values from the temperature sensor. The controller makes corrections to the pressure level value determined for the tubing system based on one or more pressure level values and the ambient temperature values.

In some embodiments, the pressure sensor is a gage pressure sensor. The controller is further configured to read ambient pressure values from an atmospheric pressure sensor and make corrections to the pressure level value determined for the tubing system based on one or more pressure level values, the ambient temperature values, and the ambient pressure values.

In some embodiments, a pressure sensor is provided that includes an air input coupleable to a source of compressed air, an air output, where the air output coupleable to an air Tillable system, a valve coupled to the air input, and a pressure sensor that is coupled between the valve and the air output. Air can flow from the air input to the pressure sensor and through the air output when the valve is open. The pressure sensor further includes a controller connected to the pressure sensor and the valve. The controller includes an electronic processor and a memory that stores instructions that when executed by the processor configure the controller. The controller is configured to open the valve, receive air input through the valve, close the valve when a specified criteria is met, receive pressure sensor data from the pressure sensor, and store the pressure sensor data in the memory.

In some embodiments, the specified criteria is based on time or a pressure level.

In some embodiments, the pressure sensor also includes a display device and the controller is further configured to analyze the pressure sensor data, generate a user interface based on the pressure sensor data, and transmit the user interface to the display device.

In some embodiments, the pressure sensor also includes a communication interface, where the controller is configured to transmit, via the communication interface, information based on the pressure sensor data to a remote server for analysis (e.g., to a cloud system).

In some embodiments, a method is provided for a pressure sensor. The method includes opening a valve coupled to an air input by an electronic controller where the air input is coupleable to a source of compressed air and air is received through the valve. The valve is closed, by the electronic processor, when a specified criteria is met. Pressure sensor data is received from the pressure sensor. The pressure sensor is coupled between the valve and an air output, where the air output is coupleable to an air fillable system. Air can flow from the air input to the pressure sensor and through the air output when the valve is open. The pressure sensor data is stored in memory by an electronic controller.

In some embodiments, the specified criteria is based on time or a pressure level.

In some embodiments, the controller is further configured to analyze the pressure sensor data, generate a user interface based on the pressure sensor data, and transmit the user interface to a display device.

In some embodiments, the electronic controller is configured to transmit the pressure sensor data to a remote server for analysis.

In some embodiments, a pressure sensor system is provided that includes an air input that is coupleable to a source of compressed air and an air output that is coupleable to an air fillable system. A valve of the pressure sensor is coupled to the air input. The system further includes a pressure sensor coupled between the valve and the air output, where air can flow from the air input to the pressure sensor and through the air output when the valve is open. The system further includes a communication interface and a controller connected to the pressure sensor, the valve, and the communication interface. The controller includes an electronic processor and a memory that stores instructions that when executed by the processor configure the controller. The controller is configured to open the valve, receive air input through the valve, close the valve when a specified criteria is met, receive pressure sensor data from the pressure sensor, and transmit information based on the pressure sensor data via the communication interface to a remote memory.

In some embodiments, the pressure sensor also includes a display device and the controller is configured to analyze the pressure sensor data, generate a user interface based on the pressure sensor data, and transmit the user interface to the display device.

In some embodiments, the controller is configured to transmit the pressure sensor data to a remote server for analysis.

In some embodiments, a method is provided for a pressure sensor. The method includes opening a valve by an electronic controller where the valve is coupled to an air input and the air input is coupleable to a source of compressed air. Air is received through the valve and the valve is closed by the electronic processor when a specified criteria is met. The electronic controller receives pressure sensor data from a pressure sensor where the pressure sensor is coupled between the valve and an air output. Air can flow from the air input to the pressure sensor and through the air output when the valve is open. The air output is coupleable to an air fillable system. The electronic controller further transmits information based on the pressure sensor data via a communication interface to a remote memory.

In some embodiments, the electronic controller is further configured to analyzes the pressure sensor data, generate a user interface based on the pressure sensor data, and transmit the user interface to a display device.

In some embodiments, the electronic controller is further configured to transmit information based on the pressure sensor data to a remote server for analysis.

In some embodiments, a pressure tester includes an air input that is coupleable to a source of compressed air, an air output that is coupleable to an air fillable system, a valve that is coupled to the air input, a user interface, and a pressure sensor. The pressure sensor is coupled between the valve and the air output and air can flow from the air input to the pressure sensor and through the air output when the valve is open. The pressure sensor system also includes a controller connected to the pressure sensor, the valve, and the user interface. The controller includes an electronic processor and a memory storing instructions that when executed by the processor configure the controller to receive an air-fill process initiation command via the user interface, open the valve to receive air via the air input in response to the air-fill process initiation command, and receive pressure sensor data from the pressure sensor. The controller is further configured to compare a pressure level indicated by the pressure sensor data to a pressure level threshold close the valve when the pressure level reaches the pressure level threshold.

In some embodiments, the controller is further configured to determine the pressure level threshold based on input received via the user interface.

In some embodiments, the controller is further configured to indicate that the air-fill process is complete via the user interface in response to the closure of the valve when the pressure level reaches the pressure level threshold.

In some embodiments, the pressure sensor system further includes a communication interface, where the controller is further configured to transmit an indication that the air-fill process is complete via the communication interface to a user device.

In some embodiments, the controller is further configured to receive a command to initiate pressure level testing of the air fillable system and determine one or more pressure levels of the air fillable system in response to the command.

In some embodiments, a method is provided for a pressure tester. The method includes receiving, by an electronic controller, an air-fill process initiation command via a user interface and opening a valve to receive air via an air input in response to the air-fill process initiation command. The air input is coupleable to a source of compressed air. Pressure sensor data is received by the electronic controller from a pressure sensor. The pressure sensor is coupled between the valve and an air output, where air can flow from the air input to the pressure sensor and through the air output when the valve is open. The air output coupleable to an air fillable system. The electronic controller further compares a pressure level indicated by the pressure sensor data to a pressure level threshold and closes the valve when the pressure level reaches the pressure level threshold.

In some embodiments, the method further includes determining the pressure level threshold based on input received via the user interface.

In some embodiments, the controller is further configured to indicate that the air-fill process is complete via the user interface in response to the closure of the valve when the pressure level reaches the pressure level threshold.

In some embodiments, the controller is further configured to transmit an indication that the air-fill process is complete via a communication interface to a user device.

In some embodiments, the method further includes receiving a command to initiate a pressure level testing of the air fillable system and determining one or more pressure levels of the air fillable system in response to the command.

In some embodiments, a pressure tester includes an air input that is coupleable to a source of compressed air, an air output that is coupleable to an air fillable system, a valve that is coupled to the air input, and a pressure sensor that is coupled between the valve and the air output. Air can flow from the air input to the pressure sensor and through the air output when the valve is open. The pressure tester further includes a communication interface and a controller connected to the pressure sensor, the valve, and the communication interface. The controller includes an electronic processor and a memory storing instructions that when executed by the processor configure the controller. The controller is configured to open the valve, receive air through the valve, and close the valve when a specified criteria is met. The controller is further configured to wait a first specified time period and receive first pressure sensor data from the pressure sensor after the first specified time period. The controller is further configured to compare a first pressure level indicated by the first pressure sensor data to a pressure level threshold and transmit a notification via the communication interface to a remote communication device in response to the first pressure level falling below the pressure level threshold.

In some embodiments, the first specified time period is shorter than a predicted sealing time relative to a time that an air fillable connection is sealed in the air fillable system.

In some embodiments, in response to the first pressure level remaining above the pressure level threshold, the controller is further configured to wait a second specified time period, receive second pressure sensor data from the pressure sensor after the second specified time period, compare a second pressure level indicated by the second pressure sensor data to the pressure level threshold, and transmit a notification via the communication interface to the remote communication device in response to the second pressure level falling below the pressure level threshold.

In some embodiments, the configuration of the controller is based on one or more parameters received by the controller from a remote user device. In some embodiments, the configuration of the controller is based on one or more parameters that conform to local construction codes.

In some embodiments, a method is provided for a pressure tester. The method includes opening, by an electronic controller, a valve of the pressure tester, receiving air input through the valve, closing, by the electronic controller, the valve when a specified criteria is met. The electronic controller waits a first specified time period, receives first pressure sensor data from the pressure sensor after the first specified time period, compares a first pressure level indicated by the first pressure sensor data to a pressure level threshold, and transmits a notification via the communication interface to a remote communication device in response to the first pressure level falling below the pressure level threshold.

In some embodiments, the first specified time period is shorter than a predicted sealing time relative to a time that a tubing connection is sealed in the tubing system.

In some embodiments, in response to the first pressure level remaining above the pressure level threshold, the electronic controller waits a second specified time period, receives second pressure sensor data from the pressure sensor after the second specified time period, compares a second pressure level indicated by the second pressure sensor data to the pressure level threshold, and transmits a notification via the communication interface to the remote communication device in response to the second pressure level falling below the pressure level threshold.

In some embodiments, the controller is configured for operation based on one or more parameters received from a remote user device. In some embodiments, the controller is configured for operation based on one or more parameters that conform to local construction codes.

In some embodiments, a system for testing pressure in an air fillable system includes an air input, where the air input is coupleable to a source of compressed air, an air output, where the air output coupleable to an air fillable system, a pressure sensor is coupled between the air output and the air output, where air can flow from the air input to the pressure sensor and through the air output, and a controller. The controller is connected to the pressure sensor and the controller includes an electronic processor and a memory. The memory stores instructions that when executed by the processor configure the controller to receive air through the air input, receive pressure level data from the pressure sensor, determine a pressure level value, and determine whether the air fillable system attached to the air output is sealed or leaking air based on the pressure level value.

In some embodiments, air received via the air input exits the air output to the air fillable system to pressurize the air fillable system. In some embodiments, the pressure level data from the pressure sensor includes multiple pressure level measurements over a time period and the determination of whether the air fillable system attached to the air output is sealed or leaking air is based on the multiple pressure level measurements taken over the time period.

In some embodiments, the determination of whether the air fillable system attached to the air output is sealed or leaking air is based on time passage, a measured pressure level, or both. In some embodiments, the system further includes a user interface, where the controller is further configured to indicate results of the determination of whether the air fillable system attached to the air output is sealed or leaking air via the user interface.

In some embodiments, the system further includes a communication interface, where the controller is further configured to indicate results of the determination of whether the air fillable system attached to the air output is sealed or leaking air via the communication interface to a user device.

In some embodiments, the controller is further configured to indicate results of the determination of whether the air fillable system attached to the air output is sealed or leaking air along with a confidence level for the determination. In some embodiments, the confidence level is selected from the group consisting of confidently sealed, confidently leaking, and uncertain. In some embodiments, the controller is further connected to a temperature sensor and is further configured to read ambient temperature values from the temperature sensor, and make corrections to the pressure level value determined for the air fillable system based on one or more pressure level values and the ambient temperature values.

In some embodiments, the pressures sensor is a gage pressure sensor and the system further includes an atmospheric pressure sensor, wherein the controller is further configured to read ambient pressure values from the atmospheric pressure sensor, and make corrections to the pressure level value determined for the air fillable system based on one or more pressure level values, the ambient temperature values, and the ambient pressure values.

In some embodiments, a method is provided for testing pressure in an air fillable system. The method includes receiving air through an air input of a pressure testing system, where the air input coupled to a source of compressed air. The electronic controller receives pressure level data from a pressure sensor, where the pressure sensor is coupled between the air input and an air output of the pressure testing system, and where air can flow from the air input to the pressure sensor and through the air output. The electronic controller determines a pressure level value for an air fillable system coupled to the air output, and determines whether the air fillable system coupled to the air output is sealed or leaking air based on the pressure level.

In some embodiments, air received via the air input exits the air output to the air fillable system to pressurize the air fillable system. In some embodiments, the pressure level data received from the pressure sensor includes multiple pressure level measurements over a time period and the determination of whether the air fillable system attached to the air output is sealed or leaking air is based on the multiple pressure level measurements over the time period.

In some embodiments, the determination of whether the air fillable system attached to the air output is sealed or leaking air is based on time passage, a measured pressure level, or both. In some embodiments, the controller is further configured to indicate results of the determination of whether the air fillable system attached to the air output is sealed or leaking air via a user interface.

In some embodiments, the controller is further configured to indicate results of the determination of whether the air fillable system attached to the air output is sealed or leaking air via a communication interface to a user device. In some embodiments, the controller is further configured to indicate results of the determination of whether the air fillable system attached to the air output is sealed or leaking air along with a confidence level for the determination. In some embodiments, the confidence level is selected from the group consisting of confidently sealed, confidently leaking, and uncertain.

In some embodiments, the controller is connected to a temperature sensor and is further configured to read ambient temperature values from the temperature sensor, and make corrections to the pressure level value determined for the air fillable system based on one or more pressure level values and the ambient temperature values.

In some embodiments, the pressure sensor is a gage pressure sensor and the system further includes an atmospheric pressure sensor, where the controller is further configured to read ambient pressure values from the atmospheric pressure sensor, and make corrections to the pressure level value determined for the air fillable system based on one or more pressure level values, the ambient temperature values, and the ambient pressure values.

In some embodiments, a system for filling an air fillable device includes an air input, where the air input is coupleable to a source of compressed air, an air output, where the air output is coupleable to an air fillable system, a valve, where the valve is coupled to the air input and where air can flow from the air input through the air output when the valve is open, a user interface, and a controller. The controller is connected to the valve and the user interface. The controller includes an electronic processor and a memory. The memory stores instructions that when executed by the processor configure the controller to receive an air-fill process initiation command via the user interface, open the valve to receive air via the air input in response to the air-fill process initiation command, and close the valve when filling of the air fillable system with air is complete.

In some embodiments, the controller determines whether the filling of the air fillable system with air is complete based on an amount of fill time. In some embodiments, the controller determines whether the filling of the air fillable system with air is complete based on output of a flow meter. In some embodiments, the controller is further configured to indicate that the air-fill process is complete via the user interface in response to the closure of the valve. In some embodiments, the pressure tester includes a communication interface, where the controller is configured to transmit an indication that the air-fill process is complete via the communication interface to a user device.

In some embodiments, a method is provided for filling an air fillable system. The method includes receiving, by an electronic controller, an air-fill process initiation command via a user interface, and opening, by the electronic controller, a valve to receive air via an air input in response to the air-fill process initiation command. The air input is coupleable to a source of compressed air and air can flow from the air input through an air output when the valve is open and the air output is coupleable to an air fillable system. The electronic processor closes the valve when the filling of the air fillable system with air is complete.

In some embodiments, the controller determines whether the filling of the air fillable system with air is complete based on an amount of fill time. In some embodiments, the controller determines whether the filling of the air fillable system with air is complete based on output of a flow meter. In some embodiments, the controller is further configured to indicate that the air-fill process is complete via the user interface in response to the closure of the valve when the pressure level reaches the pressure level threshold. In some embodiments, the controller is further configured to transmit an indication that the air-fill process is complete via a communication interface to a user device.

Other aspects of the invention will become apparent by consideration of the detailed description and accompanying drawings.

DETAILED DESCRIPTION

Figure 1:
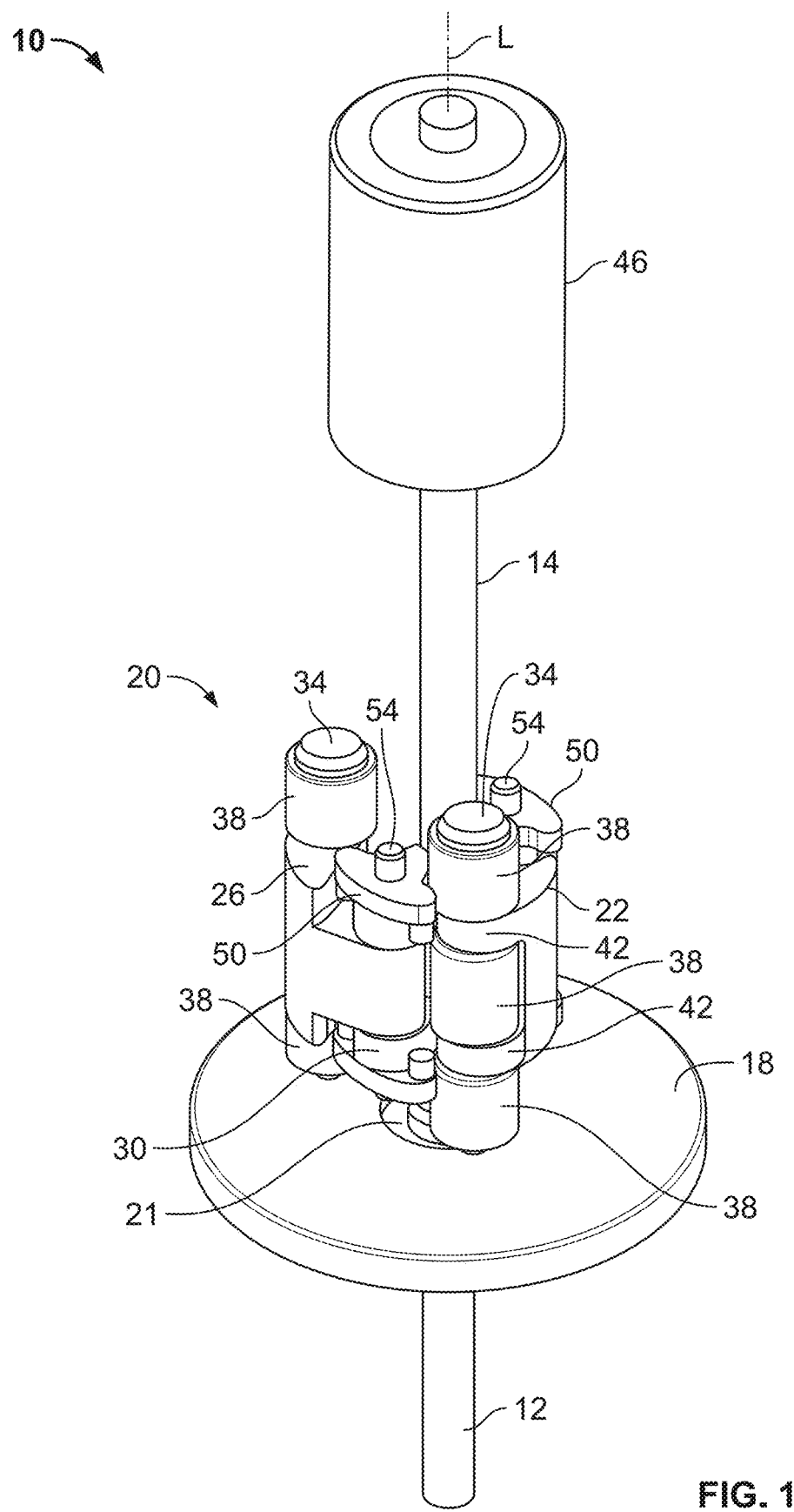
FIG. 1 is a perspective view of a working element of an expansion tool according to an embodiment of the present disclosure.
Figure 2:
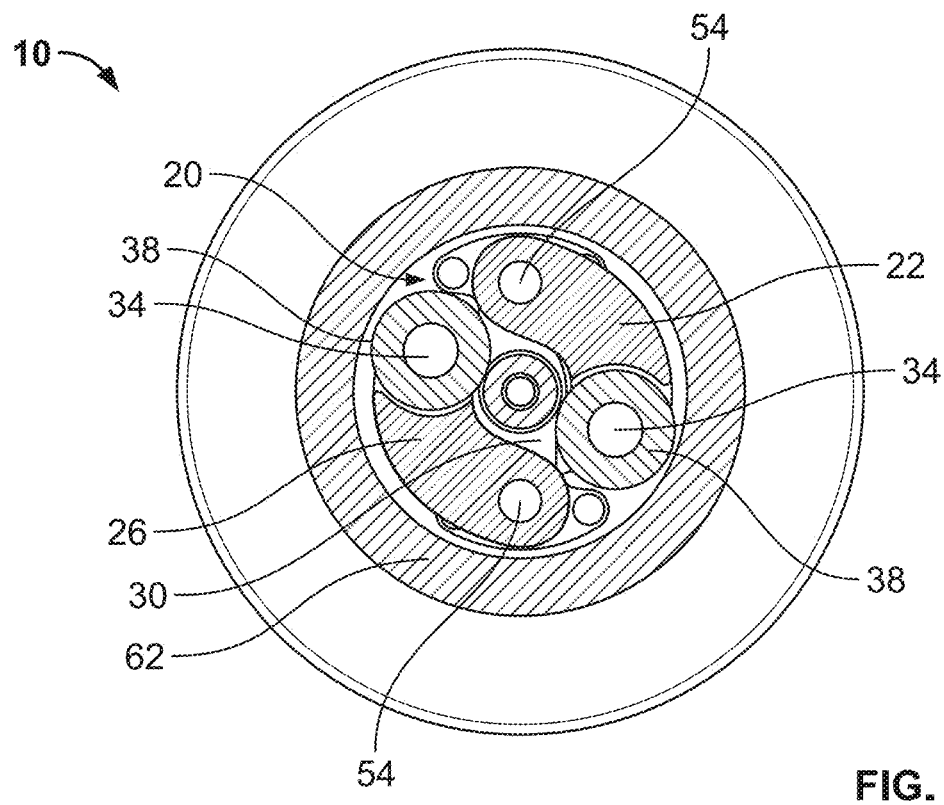
FIG. 2 is a cross-sectional view of the working element of FIG. 1 in a retracted configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components, may be used to implement embodiments disclosed herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments disclosed may be implemented in software (e.g., stored on non-transitory computer-readable medium) executable by one or more processors. As such, it should be noted that a plurality of hardware and software based devices, as well as a plurality of different structural components may be utilized to implement the embodiments disclosed. Furthermore, and as described in subsequent paragraphs, the specific mechanical configurations illustrated in the drawings are intended to be examples of embodiments and that other alternative mechanical configurations are possible. For example, "controllers" described in the specification can include processing components, such as one or more processors, one or more computer-readable medium modules, one or more input/output interfaces, and various connections (e.g., a system bus) connecting the components. In some instances, the controllers described in the specification may be implemented in one of or a combination of a microprocessor, an application specific integrated circuit (ASIC), a digital signal processor (DSP), a field programmable gate array (FPGA), or the like.

FIGS. 1-4 illustrate a working element 10 of an expansion tool usable to expand PEX tubing prior to inserting a fitting. Referring to FIG. 1, the working element 10 includes a drive member in the form of a drive shaft 12, a central shaft 14, a back plate 18, and a roller assembly 20. The drive shaft 12 is rotatably supported by a bearing 21 within the back plate 18, such that the drive shaft 12 is rotatable relative to the back plate 18 about a longitudinal axis L of the drive shaft 12. The roller assembly 20 and the central shaft 14 are coupled for co-rotation with the drive shaft 12 about the longitudinal axis L. The drive shaft 12 is configured to be rotated by a drive mechanism (not shown) of the expansion tool. In some embodiments, the working element 10 may be configured for attachment to other types of rotary power tools, such as drills.

With continued reference to FIG. 1, the roller assembly 20 includes a first arm 22, a second arm 26, and an attachment portion or main body 30. The attachment portion 30 is coupled for co-rotation with the drive shaft 12, and in some embodiments, the drive shaft 12 and the attachment portion 30 may be integrally formed together as a single piece. The central shaft 14 extends from the attachment portion 30 opposite the drive shaft 12 and may be coupled to the attachment portion 30 by a key and keyway arrangement, a spline interface, or any other suitable rotation-transmitting coupling. Alternatively, the central shaft 14 and the attachment portion 30 may be integrally formed together as a single piece.

The first arm 22 and the second arm 26, which may also be referred to as first and second roller supports, each have a first or proximal end pivotally coupled to the attachment portion 30 on opposite sides of the longitudinal axis L. A second or distal end of each of the arms 22, 26 supports a roller shaft 34. Each roller shaft 34 extends through the respective arm 22, 26 in a direction parallel to the longitudinal axis L. Each of the roller shafts 34 rotatably supports a plurality of generally cylindrical rollers 38. In the illustrated embodiment, each of the roller shafts 34 supports three rollers 38, and the rollers 38 are axially separated by flanges 42 formed at the distal ends of the arms 22, 26. In other embodiments, the roller shafts 34 may support any number of rollers 38. In the illustrated embodiment, the working element 10 further includes a guide roller 46 rotatably coupled to the central shaft 14 adjacent an end of the central shaft 14 opposite the attachment portion 30.

The illustrated roller assembly 20 further includes brackets 50 coupled to opposite axial ends of the attachment portion 30. The brackets 50 support pivot shafts 54 that pivotally couple the respective arms 22, 26 to the attachment portion 30. In some embodiments, the brackets 50 may include stops engageable with an associated one of the arms 22, 26 at the retracted position and/or the expanded position to limit movement of the arms 22, 26.

The arms 22, 26 are pivotable relative to the attachment portion 30 between a first or retracted position (FIG. 2) and a second or expanded position (FIG. 3) in response to rotation of the drive shaft 12 about the longitudinal axis L. Specifically, as the drive shaft 12 rotates, the distal ends of the arms 22, 26 tend to pivot toward the expanded position due to inertia. Although the illustrated roller assembly 20 includes two arms 22, 26, in other embodiments, the roller assembly 20 may include three or more arms, each supporting rollers 38.

Figure 4:
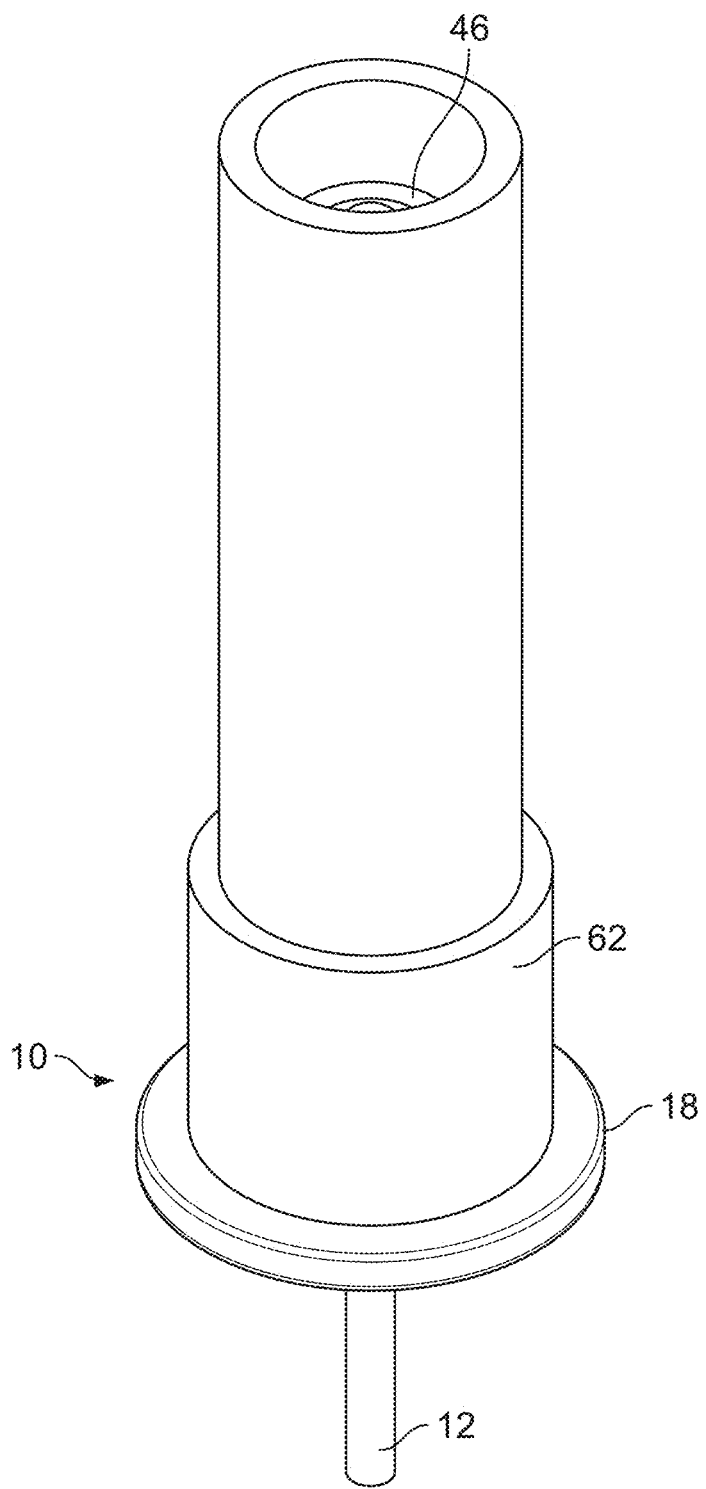
FIG. 4 is a perspective view of the working element of FIG. 1 inserted into a PEX tube.

In operation, the working element 10 is inserted into a PEX tube 62 with the arms 22, 26 in the retracted position (FIG. 2), until the back plate 18 abuts the end of the PEX tube 62 (FIG. 4). The drive shaft 12 is then rotationally driven by the drive mechanism of the expansion tool at a high speed. For example, in some embodiments, the drive shaft 12 may be driven at speeds between about 10,000 RPM and about 25,000 RPM. In some embodiments, the drive shaft 12 may be driven at speeds between about 15,000 RPM and about 20,000 RPM. In the illustrated embodiment, the drive shaft 12 is driven at about 18,000 RPM.

Figure 3:
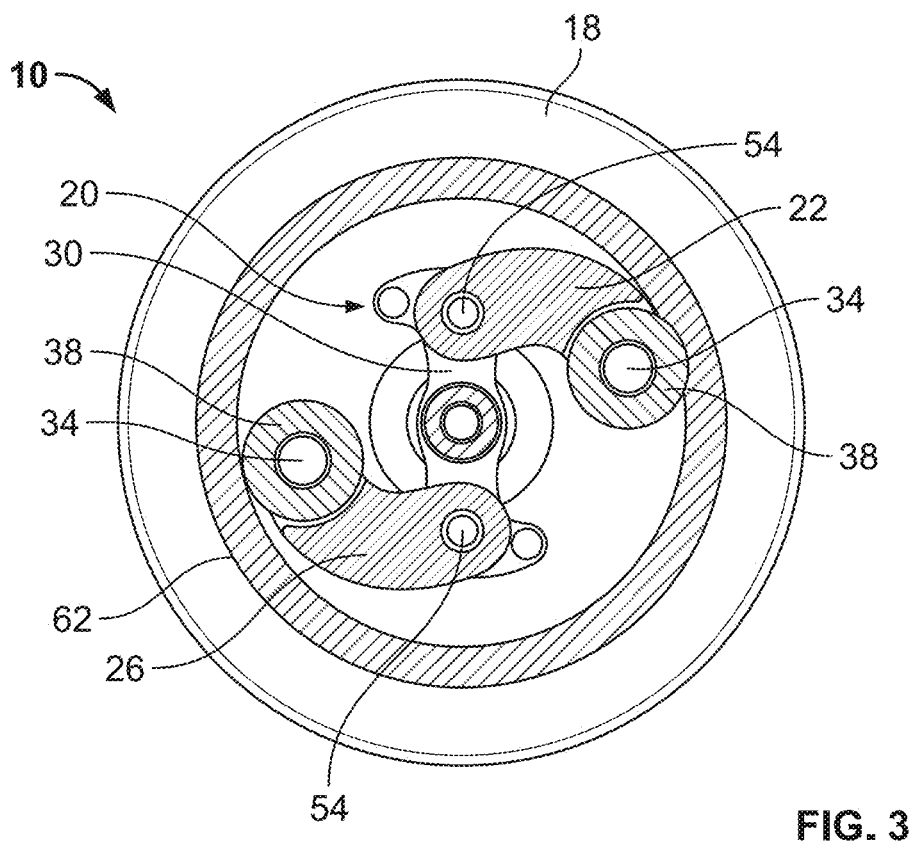
FIG. 3 is a cross-sectional view of the working element of FIG. 1 in an expanded configuration.

As the drive shaft 12 rotates at high speed, the rollers 38 travel along the inner circumference of the PEX tube 62. Due to inertia, the rollers 38 exert an apparent centrifugal force on the inside of the PEX tube 62 that is equal to the centripetal force on the rollers 38. This force causes the PEX tube 62 to resiliently expand as the arms 22, 26 move toward the expanded position (FIG. 3). The guide roller 42 (FIG. 1), which is inserted deeper into the PEX tube 62, supports the central shaft 14 and stabilizes the working element 10. Once the arms 22, 26 reach the expanded position and expansion is complete, the user may remove the working element 10 from the expanded PEX tube 62. The user then inserts a fitting into the expanded PEX tube 62, and the tube 62 recovers to form a seal around the fitting.

FIG. 5A-7, illustrate a working element 100 of an expansion tool according to another embodiment. The illustrated working element 100 is configured to be coupled to an expansion tool and rotated about a longitudinal axis 124 via a drive mechanism of the expansion tool to expand PEX tubing.

Figure 5A:
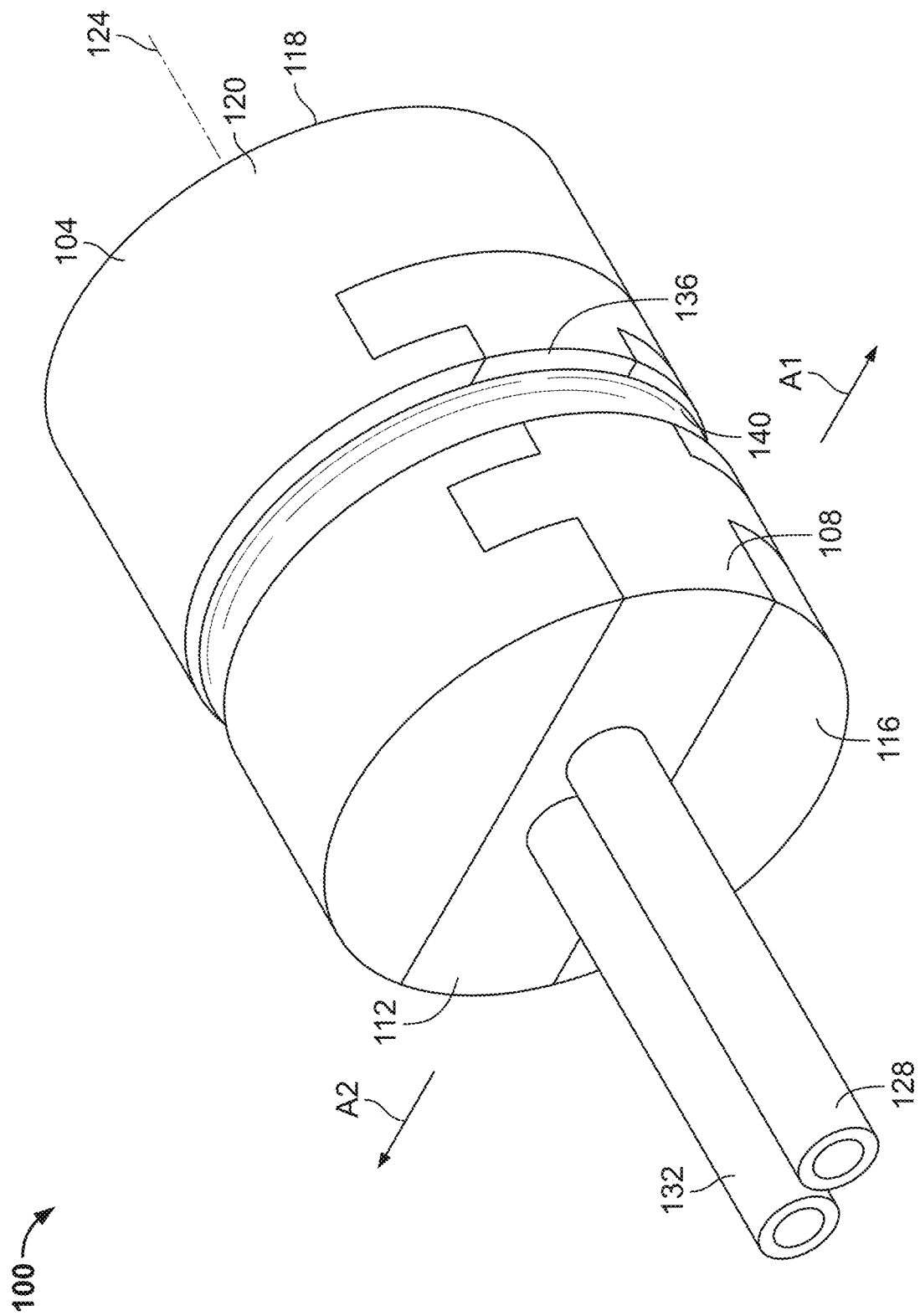
FIG. 5A is a perspective view of a working element of an expansion tool according to another embodiment of the present disclosure, illustrated in a retracted configuration.

Referring to FIG. 5A, the working element 100 includes a housing or main body 104 and first and second roller supports 108, 112 slidably coupled to the housing 104. The illustrated housing 104 has a front surface 116, a rear surface 118, and a circumferential surface 120 extending between the front and rear surfaces 116, 118. The longitudinal axis 124 passes through a center of each of the front surface 116 and the rear surface 118.

Figure 5B:
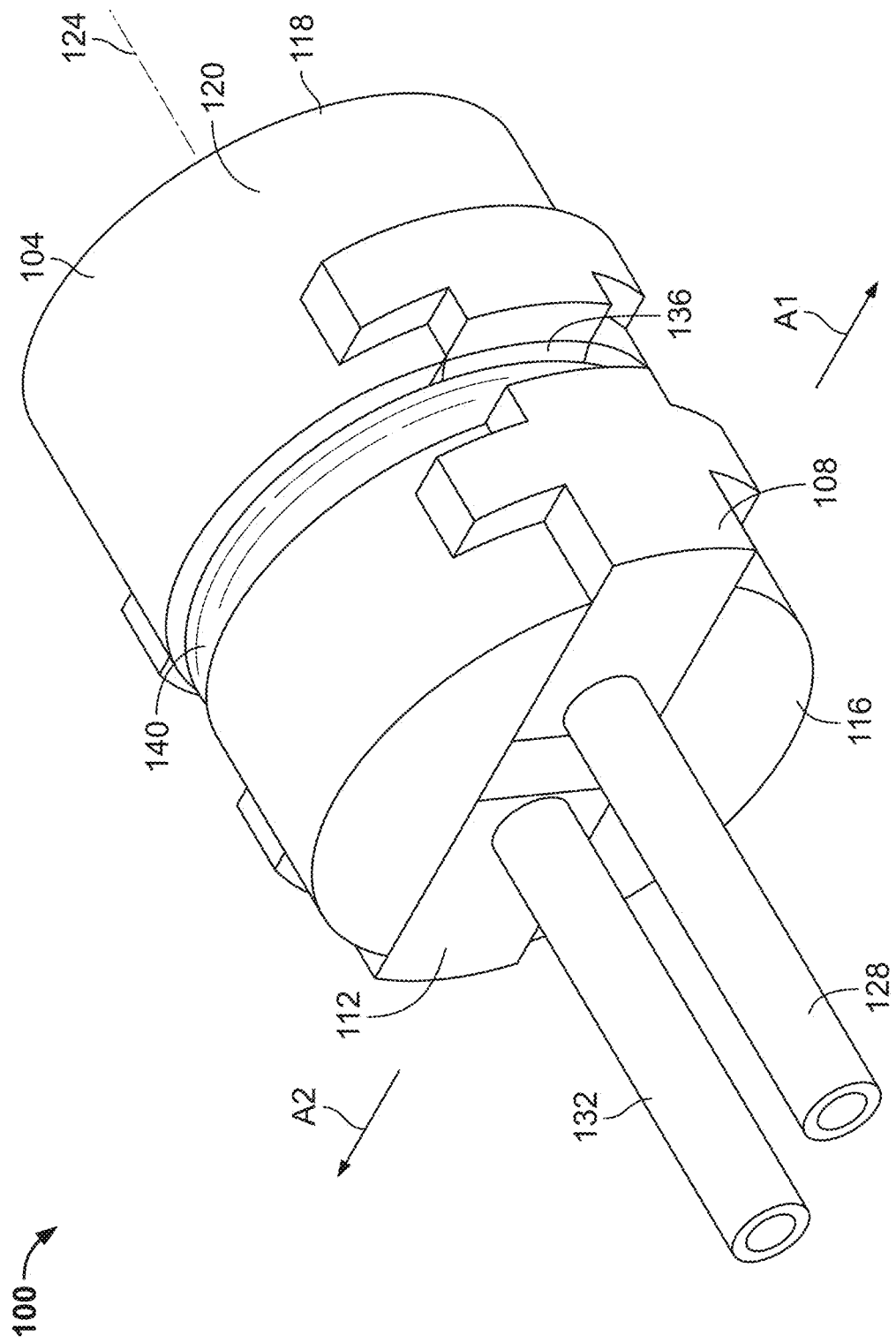
FIG. 5B is a perspective view of the working element of FIG. 5A illustrated in an expanded configuration.

The first and second roller supports 108, 112 are moveable in relation to the housing 104 between a retracted position (FIG. 5A) and an expanded position (FIG. 5B). In particular, the first roller support 108 is movable from the retracted position to the expanded position in a first direction A1, and the second roller support 112 is movable from the retracted position to the expanded position in a second direction A2 that is opposite the first direction A1. The first and second directions A1, A2 are substantially transverse to the longitudinal axis 124.

A first cylindrical roller 128 extends forward from the first roller support 108, and a second cylindrical roller 132 extends forward from the second roller support 112 parallel with the first roller 128. The first and second rollers 128, 132 are each parallel with the longitudinal axis 124. The first and second rollers 128, 132 are moveable together with the first and second roller supports 108, 112 as the first and second roller supports 108, 112 move in the first and second directions A1, A2. Although the illustrated working element 100 includes two roller supports 108, 112 and two rollers 128, 132, the working element 100 may include three or more roller supports and accompanying rollers in other embodiments. In such embodiments, each of the roller supports and rollers may be movable relative to the housing 104 in a radial direction.

In the illustrated embodiment, the housing 104 and the roller supports 108, 112 collectively define an annular groove 136 that extends around the circumference of the housing 104. A resilient ring 140, such as a rubber O-ring, is disposed in the groove 136. The ring 140 acts as a biasing member to bias the first and second roller supports 108, 112 toward the retracted position illustrated in FIG. 5A. Movement of the roller supports 108, 112 toward the expanded position resiliently stretches the ring 140. In other embodiments, the roller supports 108, 112 may be biased toward the retracted position by one or more tension springs coupled to and spanning between the roller supports 108, 112. Alternatively, the roller supports 108, 112 may be biased toward the retracted position by any other suitable biasing means.

Figure 7:
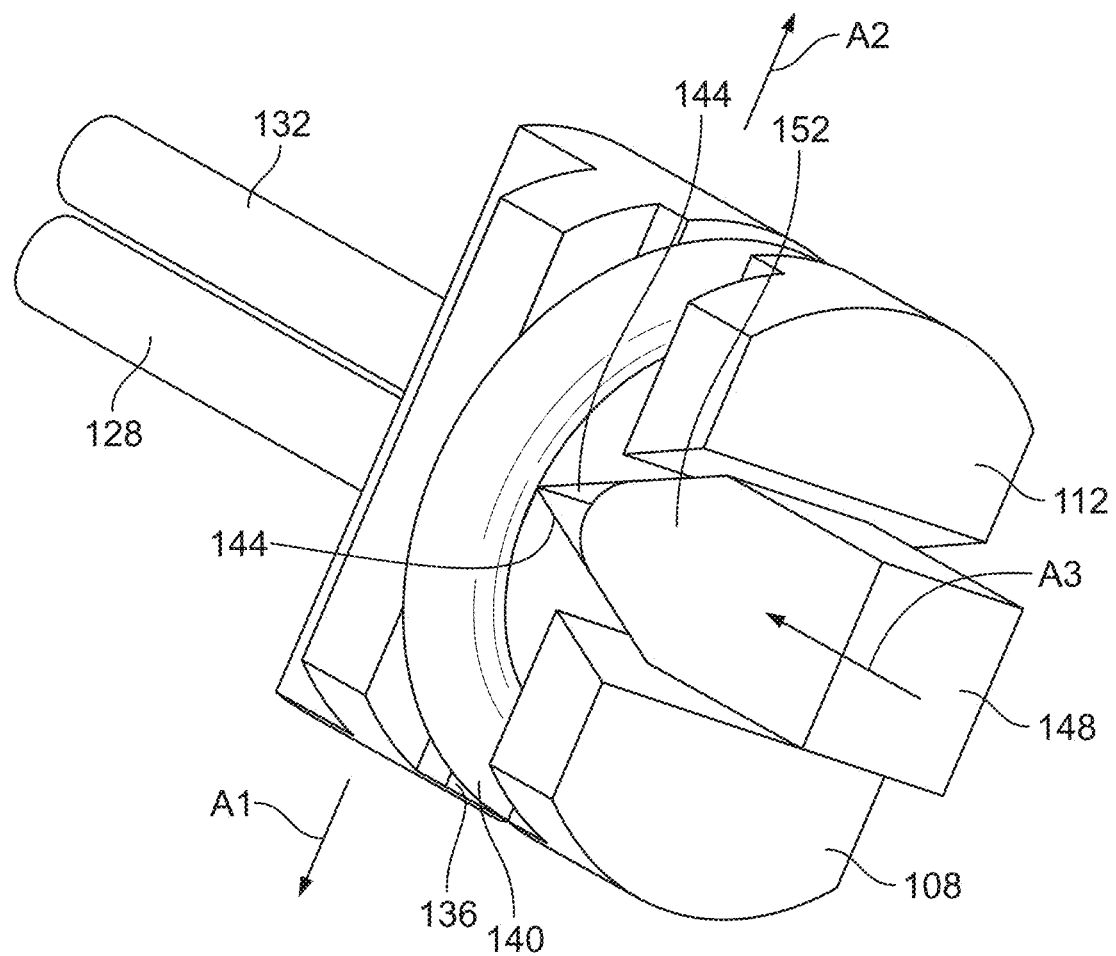
FIG. 7 is a rear perspective view of the working element of FIG. 5A with a housing removed.

With reference to FIG. 7, in the illustrated embodiment, an inner side of each of the roller supports 108, 112 includes an angled cam surface 144. The cam surfaces 144 form a substantially triangular-shaped recess when the roller supports 108, 112 are in the retracted position, which receives an expanding member or mandrel 148. A distal end 152 of the expanding member 148 includes corresponding angled surfaces that are engageable with the cam surfaces 144 of the roller supports 108, 112. As such, movement of the expanding member 148 in the direction of arrow A3 moves the roller supports 108, 112 outward toward the expanded position. In other embodiments, the roller supports 108, 112 may be moved outward in other ways. For example, in some embodiments, the expanding member 148 may include a circumferential cam surface configured to expand the roller supports 108, 112 in response to rotation of the expanding member 148.

Figure 6:
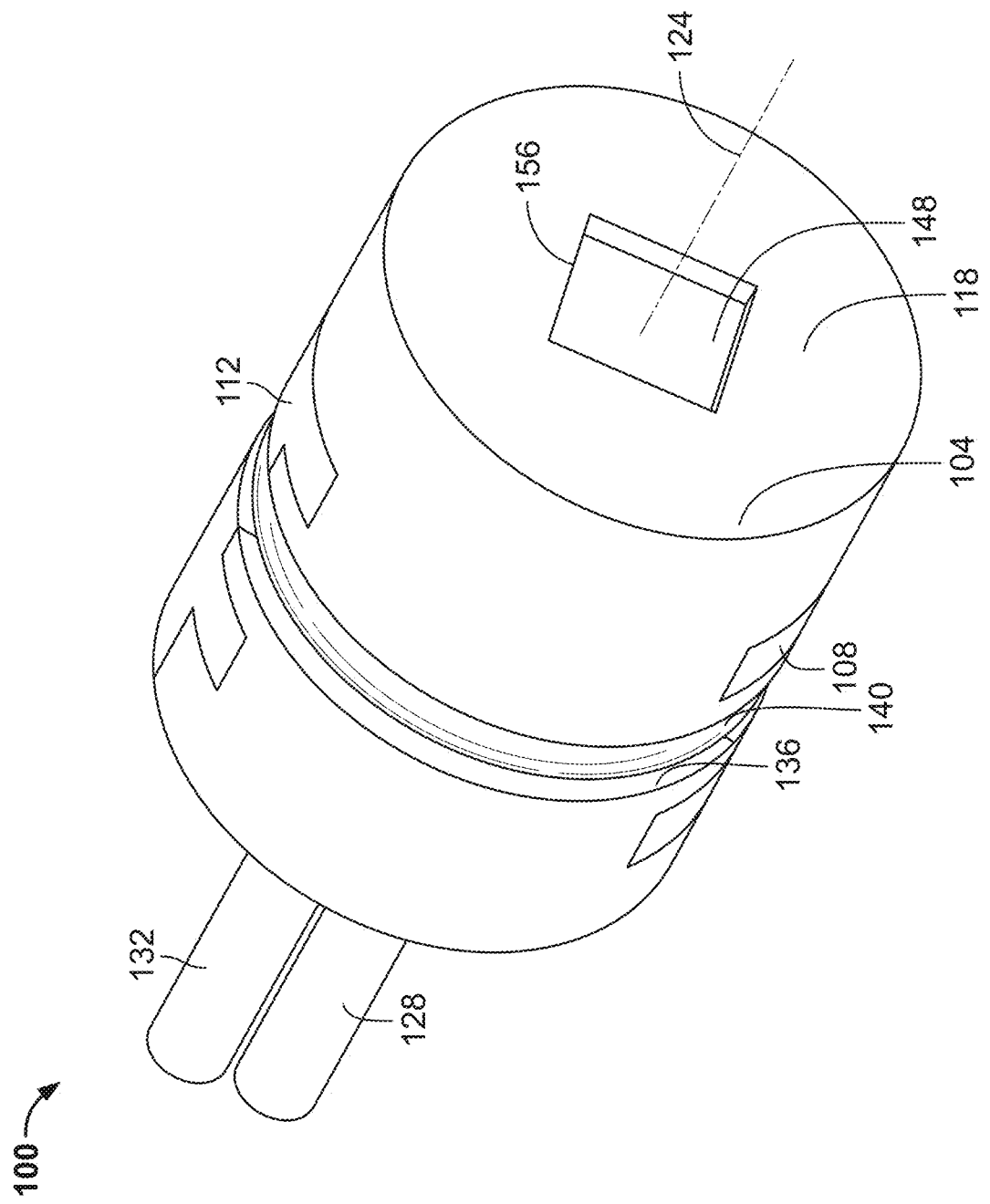
FIG. 6 is a rear perspective view of the working element of FIG. 5A.

With reference to FIG. 6, an opening 156 is formed in the rear surface 118 of the housing 104 such that the expanding member 148 is accessible through the housing 104. A drive member (not shown) of the expansion tool is operable to engage with the expanding member 148 through the opening 156 in order to press the expanding member 148 forward against the cam surfaces 144. The force exerted onto the cam surfaces 144 by the expanding member 148 overcomes a spring force exerted onto the first and second sections 108, 112 by the resilient ring 120. This causes the first and second sections 108, 112, as well as the first and second rollers 128, 132, to move in the first and second directions A1, A2, respectively. In some embodiments, the housing 114 may be axially fixed to the expansion tool to resist the axial reaction force generated by advancing the expanding member 148. For example, the housing 114 may be coupled to a gear case of the expansion tool via one or more bearings.

The illustrated opening 156 has a square shape that forms a rotation-transmitting coupling with the drive member of the expansion tool. As such, once the first and second sections 108, 112 have been moved to the expanded position, the drive member is operable to rotate the housing 104, thereby rotating the first and second rollers 128, 132. In other embodiments, the opening 156 may interface with the drive member in other ways (e.g., a spline interface, etc.).

In operation, with the roller supports 108, 112 in the retracted position (FIG. 5A), the first and second rollers 128, 132 are inserted into a PEX tube to be expanded (e.g., until the front surface 116 of the housing 104 abuts an end of the tubing). Subsequently, the drive member forces the expanding member 148 forward in the direction of arrow A3 (FIG. 7). The distal end 152 of the expanding member 148 bears against the cam surfaces 144 of the roller supports 108, 122 such that the first and second rollers 128, 132 expand to a distance corresponding with a desired expansion of the PEX tubing (FIG. 5B). Alternatively, with the roller supports 108, 112 in the retracted position, a drive mechanism in the expansion tool may translate the working element 100 to insert the roller supports 108, 112 into a PEX tube to be expanded in addition to rotating the working element 100.

Once the first and second rollers 128, 132 are in the desired position, the drive member rotates the housing 104 about the longitudinal axis 124, thereby rotating the first and second rollers 128, 132 and, thus, expanding the entire inner circumference of the PEX tube. Once the PEX tube has been expanded to a desired diameter, the drive member is retracted, and the resilient ring 140 restores the first and second roller supports 108, 112 back to the retracted position (FIG. 5A). At this point, working element 100 may be removed from the PEX tube and a fitting inserted into the tube. The expanded PEX tube recovers to form a seal around the fitting.

In some embodiments, the operation of the working element 100 can be controlled in various ways to achieve a desired expansion performance (e.g., expansion diameter, desired recovery time, etc.). For example, the rate and/or distance that the drive member moves the expanding member 148 may be variable. The rotational speed and/or duration that the drive member rotates the housing 104 may also be variable. In some embodiments, one or more of these parameters may be automatically varied based on a selected size of PEX tube to be expanded.

Typical working heads for PEX expansion tools include a plurality of jaws that repeatedly expand and retract to gradually expand the end of a PEX tube. Because there are gaps between adjacent jaws that form when the jaws expand, the jaws typically leave impressions in the inner circumference of the PEX tube that may result in gaps and leakage around an inserted fitting. The working elements 10, 100 described above with reference to FIGS. 1-7 each use rollers to smoothly increase the diameter of the PEX tubing. Thus, the working elements 10, 100 advantageously leave no impressions in the inner circumference of the PEX tube, and the PEX tube may develop a more reliable seal with an inserted fitting.

After constructing a tubing system (e.g., using a PEX expansion tool such as a PEX expansion tool including the working element 10 or the working element 100 described above with reference to FIGS. 1-7, it may be desirable to test the tubing system to determine the integrity of the connection and seal between each tubing segment and each fitting. Accordingly, the present disclosure further provides systems and methods for testing the integrity of tubing system.

Figure 8:
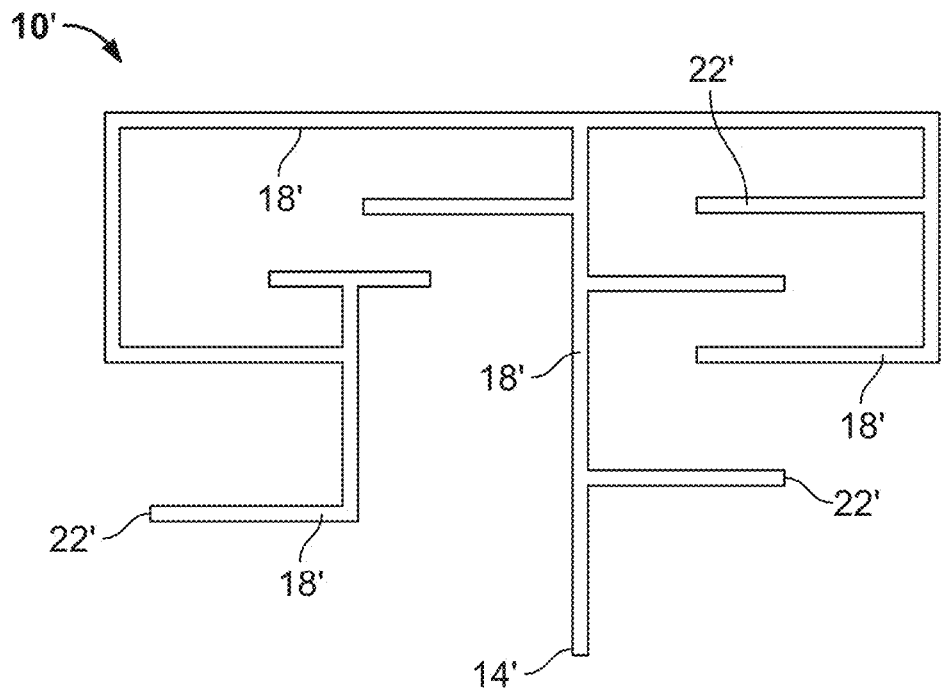
FIG. 8 is a schematic view of an exemplary tubing system.

For example, FIG. 8 illustrates a PEX (cross-linked polyethylene) tubing system 10' including an inlet 14', a plurality of interconnected tubing segments 18', each terminating at a connection end 22'. The connection end 22' of each tubing segment 18' receives a fitting (e.g., an elbow, a T-fitting, a plug, an adapter, etc.; not shown). To couple the fitting to the connection end 22', a tube expander, including but not limited to the working elements 10, 100 described above with reference to FIGS. 1-7, may be used to elastically expand the connection end 22' in order for the fitting to be inserted into the connection end 22'. Once the fitting has been inserted into the connection end 22', the connection end 22' gradually elastically recovers around the fitting, creating a fluid-tight seal between the fitting and the interior wall of the connection end 22'.

Figure 9:
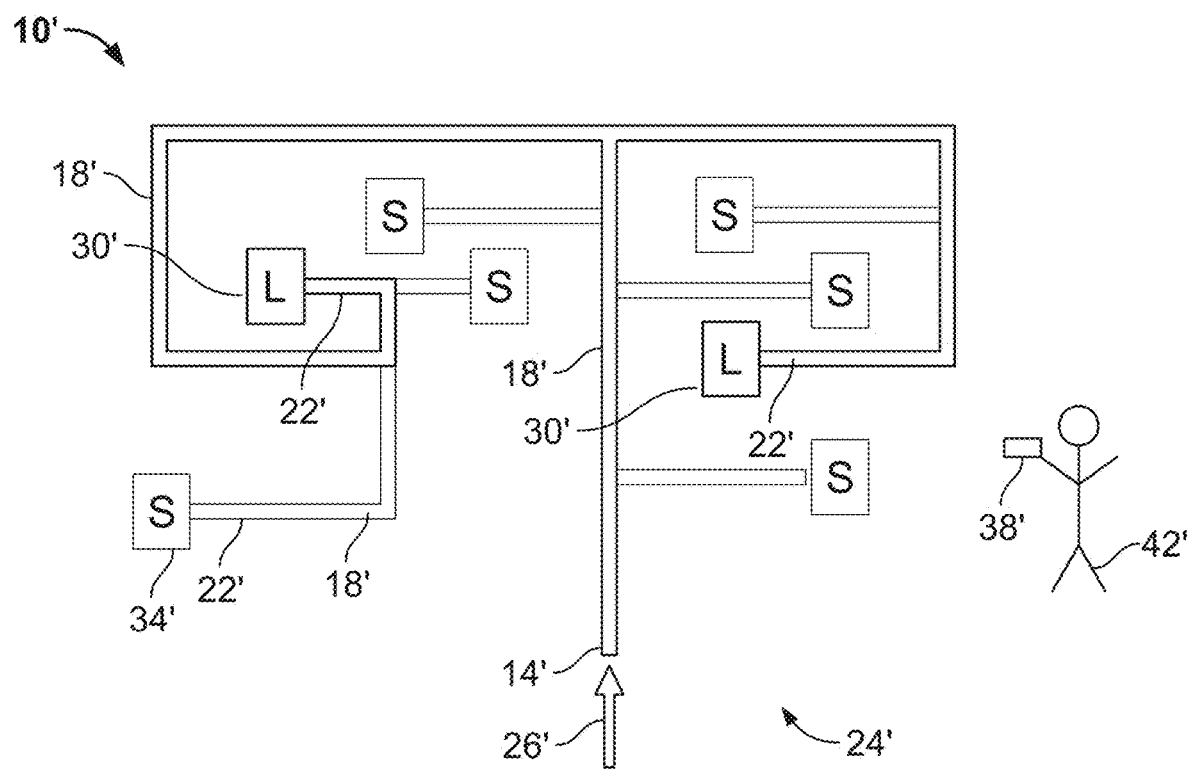
FIG. 9 is a schematic view of the tubing system of FIG. 8 with a system for identifying and sealing leaks according to one embodiment of the present disclosure.

FIG. 9 illustrates a leak identifying and sealing system 24' according to one embodiment, which may be used to identify and seal leaks that may exist at any of the fittings of the PEX tubing system 10'. The illustrated system 24' includes a source of hot air 26' that may be coupled to the inlet 14' of the tubing system 10'. The source of hot air 26' may be a heat pump or the like. As the source of hot air 26' begins to supply hot air into the inlet 14', the hot air will only flow through the segments 18' of the tubing system 10' that lead to a leaking fitting 30', due to the hot air escaping around the leaking fitting 30'. As the hot air flows past the leaking fitting 30', the tubing segment 18' and the connection end 22' proximate the leaking fitting 30' begin to heat up. Cross-linked polyethylene tubing that has been expanded with a tube expander recovers (i.e. shrinks) more quickly at higher temperatures. Thus, as the hot air heats the connection end 22' associated with each of the leaking fittings 30', the elastic recovery of the connection ends 22' around the fittings 30' is accelerated to automatically provide a fluid-tight seal between the connection ends 22' and the fittings 30'.

In addition to speeding the elastic recovery process of the connection ends 22' around their respective fittings, the system 24' may be used to identify where a leak is occurring. Because the hot air will only flow through the segments 18' of the tubing system 10' that include a leaking fitting 30', the segments 18' that lead to the leaking fitting 30' will be of a higher temperature than the segments 18' of the tubing system with fully sealed fittings 34'. In the illustrated embodiment, the system 24' includes a portable thermal detector 38' (e.g., a thermal camera or a similar apparatus such as an infrared thermometer), which may be used to detect the heat distribution across the tubing system 10'.

Figure 10:
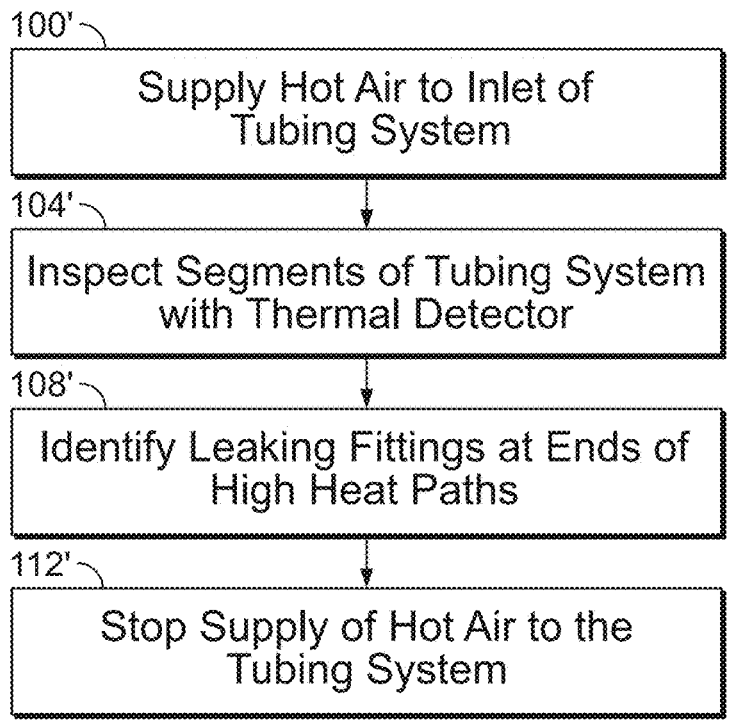
FIG. 10 illustrates a method of using the system for identifying and sealing leaks of FIG. 9.

With reference to FIGS. 9 and 10, in operation, the user 42' connects the source of hot air 26' to the inlet 14' of the tubing system 10' at step 100'. Power is supplied to the source of hot air 26' to pump the hot air into the tubing system 10'. The hot air flows through any segments 18' of the tubing system 10' that lead to a leaking fitting 30'. The hot air itself may seal the leak by accelerating recovery of the associated connection end 22 around the leaking fitting 30'.

If some fittings 30' continue leaking, the user 42' may use the thermal detector 38' to inspect the segments 18' of the tubing system 10' at step 104'. The user 42' follows the segments 18 that are at a higher temperature to identify any remaining leaking fittings 30' at the ends of the higher temperature segments 18' at step 108'. By following areas of elevated temperature, a user 42' operating the thermal detector 38' may quickly and easily identify leaking connections 30' and make appropriate repairs. For example, the user 42' may use a heat gun (not shown) on the connection ends 22' with the leaking fittings 30' in order to produce a seal, the user may remove and reinsert the fitting, etc. Once all of the leaking fittings 30' in the system 10' are sealed, the user 42' may decouple the source of hot air 26' from the inlet 14' at step 112'. The tubing system 10' can then be put into service and pressurized with fluid. Alternatively or additionally, other systems and methods for testing the integrity of the tubing system may be performed prior to placing the tubing system into service.

For example, the present disclosure further provides systems and methods for testing pressure in a tubing system, such as a PEX tubing system used, for example, in building pipework systems, hydronic radiant heating and cooling systems, domestic water piping, or insulation for high voltage electrical cables. Other applications include natural gas and offshore oil applications, chemical transportation, and transportation of sewage and slurries. PEX pipes (i.e., PEX tubing) may be used as an alternative to polyvinyl chloride (PVC), chlorinated polyvinyl chloride (CPVC), or copper or galvanized steel tubing for use in plumbing systems. PEX pipes may be flexible such that they bend around or wind through building structures.

PEX pipes may be connected in systems using various methods, for example, copper crimping rings, stainless steel clamps, and compression fittings. Also, an expansion method utilized for connecting PEX tubing may use a PEX expander tool with a working element, such as the working elements 10, 100 described above with reference to FIGS. 1-7, that stretches the diameter of a PEX pipe (i.e., tube). The end of a fitting (e.g., a brass fitting or connector) is then inserted into the expanded PEX pipe. The PEX pipe then retracts or shrinks and can create a water-tight seal around the fitting. The diameter of expansion and ambient temperature are two factors that may affect the time to seal the PEX pipe to the fitting.

However, in some embodiments, the time needed for a PEX connection to seal may vary depending on many factors and may be effectively random. In this regard, the time to seal may not be predicable for a single connection, but a prediction can be made about a group of connections (e.g., a group of connections made for plumbing a building). If connections in 100% of PEX systems seal by time T_100, a user would wait that long for any particular PEX system to seal to be certain that all connections in their system are sealed before beginning pressure testing the system. However, in 75% of PEX systems, all connections may be sealed by time T_75. Unfortunately, a user may not know which PEX systems seal quicker and must wait until time T_100 to start the pressure testing. This uncertainty means that a percentage of users will wait much longer than necessary to pressure test their PEX system. The present disclosure provides an automated pressure test device that monitors a PEX system over time and alerts a user when their system is sealed. The automated pressure test device thereby improves the time to complete pressure testing by eliminating time spent unnecessarily waiting for sealing, after the PEX system has already sealed, before beginning a pressure test.

Figure 11:
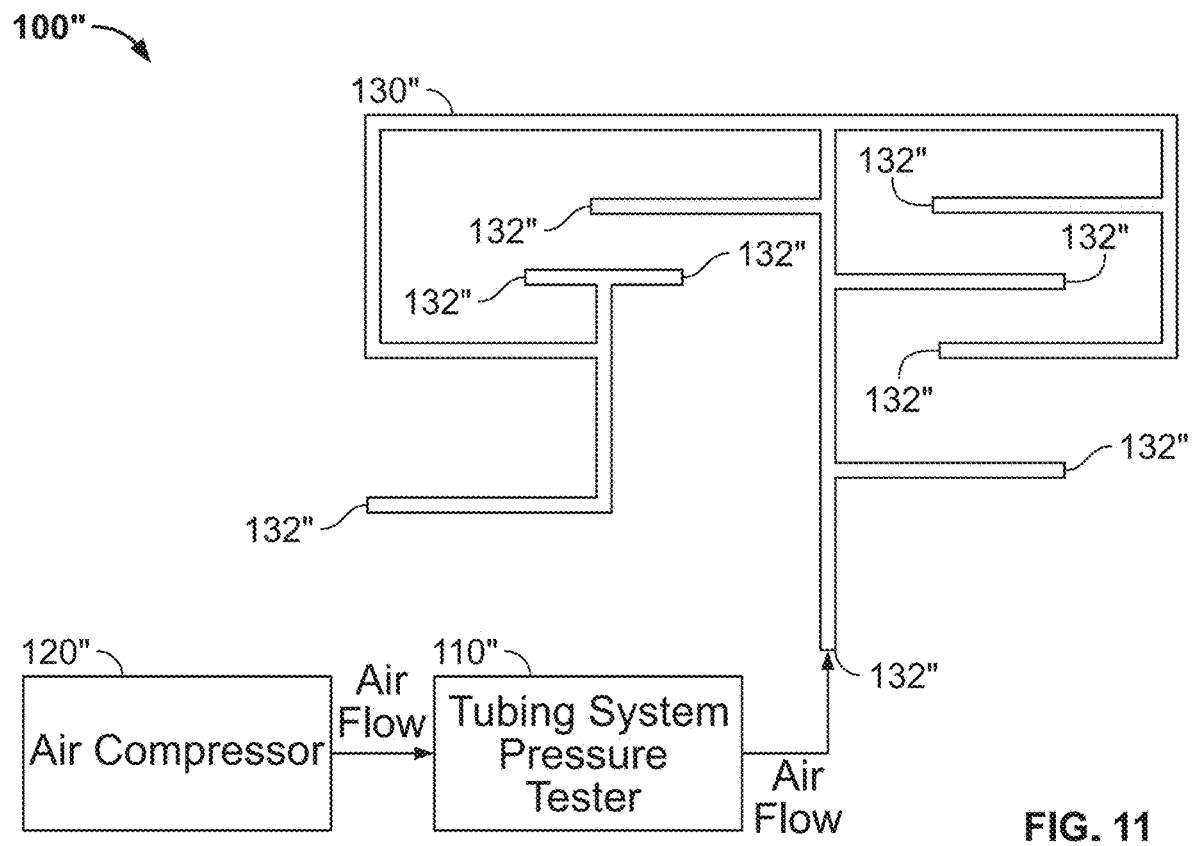
FIG. 11 is a diagram of a system for measuring leaks in a tubing system using a tubing system pressure tester, in accordance with some embodiments.

FIG. 11 is a diagram of a system 100" for measuring leaks in a tubing system (i.e., air fillable system or system under test) using a pressure tester. The system 100" includes an air compressor 120", a pressure tester 110", and a tubing system 130". The air compressor 120" is connected to the pressure tester 110", which is connected to the tubing system 130" such that air flows from the air compressor 120" through the pressure tester 110" and into the tubing system 130".

The air compressor 120" is a device that converts power into potential energy stored as pressurized air (i.e., compressed air). The air compressor 120" may be powered using, for example, an electric motor or a diesel or gasoline engine (not shown). The air compressor 120" forces air into a storage tank (not shown), which increases the pressure in the tank over time. The compressed air is held in the tank until it is released from the compressor as kinetic energy and the tank depressurizes. When tank pressure reaches a lower limit, the air compressor 120" may turn on again and re-pressurize the tank.

The tubing system 130" comprises tubing in between a plurality of pipe connectors 132" that connect the tubing system 130" to other components of a plumbing system or to another tubing system or tube, for example. Other connectors 132" (not shown) may be included in the tubing system 130", for example, where a first tube intersects a second tube. In some embodiments the tubing system 130" is a PEX system. However, the tubing system 130" is not limited to a specific type of tubing system. For testing purposes, an output of the pressure tester 110" is connected to an input connector 132" for testing for leaks in the tubing system 130". The pressure tester 110" is described in further detail with respect to FIGS. 12A-B. When the tubing system 130" is in use, for example, as in a residential plumbing system, liquids may enter and/or exit the connectors 132" to reach various destinations, such as a faucet in a building. In some embodiments, the tubing system 130" may include any suitable type of air fillable system (e.g., pipes made of metal, plastic, or other materials). Also, in place of the tubing system 130", other types of air fillable systems that receive pressurized air may be connected to the output of the pressure tester 110" and tested for air pressure, or filled with air in a controlled manner by the system 100" as described in more detail below.

Figure 12A:
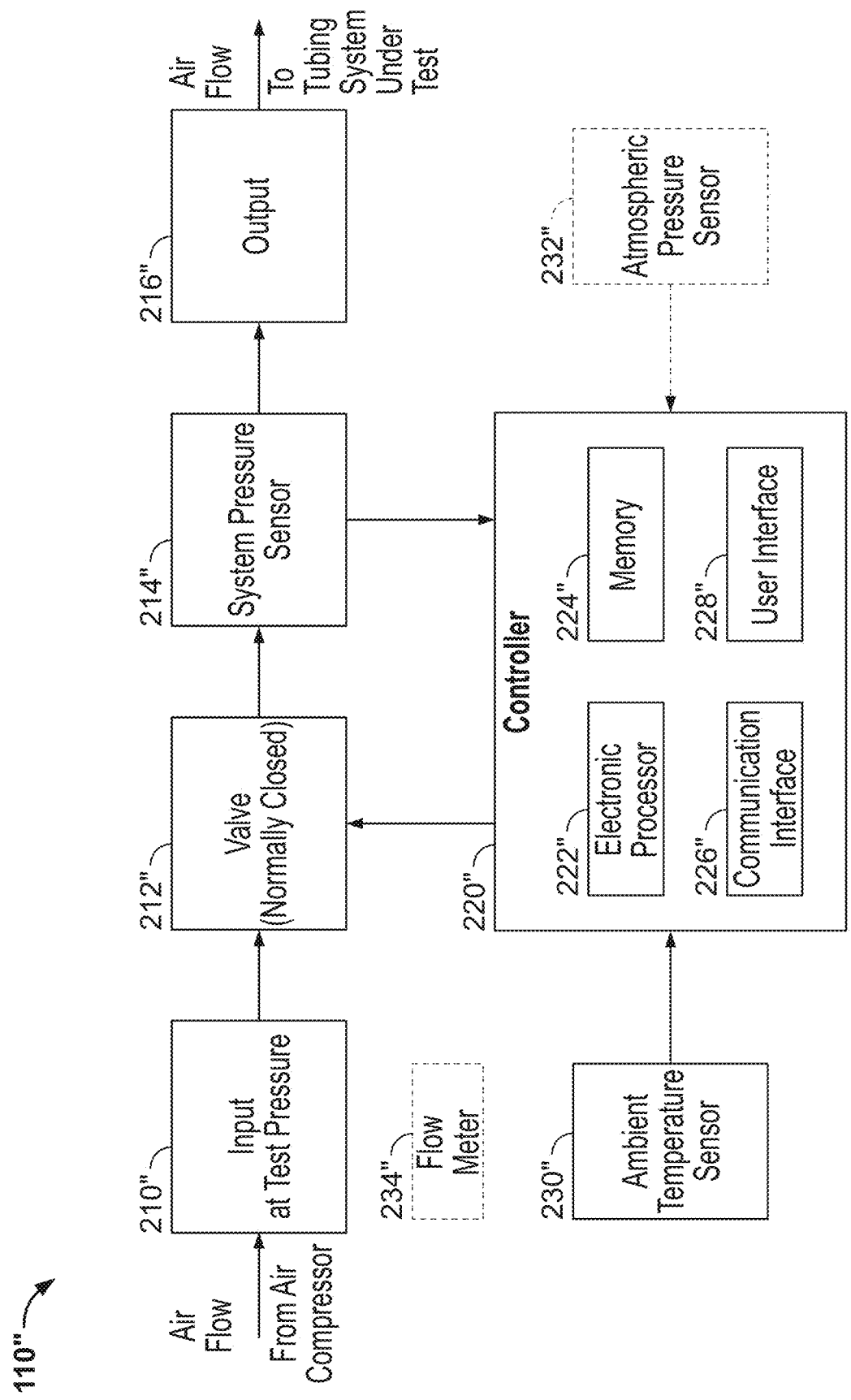
FIGS. 12A and 12B are diagrams of a pressure tester device for monitoring a tubing system over time and alerting a user when the tubing system is sealed or leaking, in accordance with some embodiments.
Figure 12B:
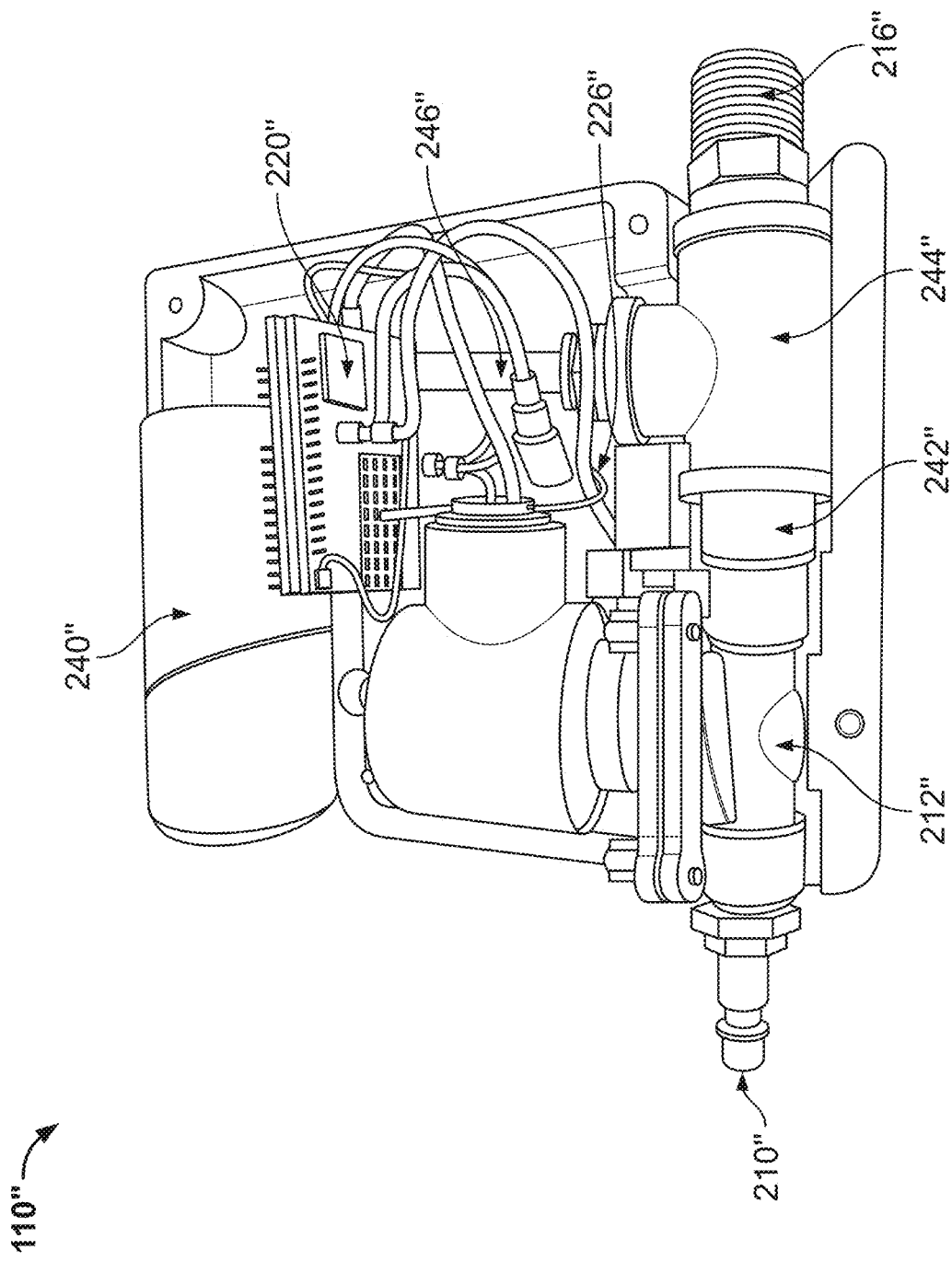

FIGS. 12A and 12B are illustrate a pressure tester device 110" for monitoring a tubing system or other type of air fillable system over time, and alerting a user when a system is sealed or leaking. The pressure tester 110" includes an air input 210", a valve 212", a system pressure sensor 214", an air output 216", and a controller 220". A flow meter 234" may be included as part of the pressure tester 110", or may be separate or connected to the presser tester 110". The flow meter 234" measures the flow of air into, through, or out of the pressure tester 110". The controller 220" includes, among other things, an electronic processor 222", a memory 224", a communication interface 226", and a user interface 228". The pressure tester 110" also includes, or is connected to, one or more ambient temperature sensors 230" (illustrated as a single ambient temperature sensor 230" in FIG. 12A). In some embodiments, where the system pressure sensor 214" measures gage pressure, the pressure tester 110" may also include, or be connected to, an atmospheric pressure sensor 232". In some embodiments, the valve 212" is a solenoid valve. However, in some embodiments, the valve 212" is another type of controllable valve. Also shown are a power source 240" (e.g., a rechargeable battery pack in some embodiments), a connector 242", and a T-connector 244".

The air input 210" is configured to receive input from the air compressor 120" at a pressure suitable for testing the tubing system 130". The valve 212" is connected to the air input 210" and the system pressure sensor 214" is disposed between the valve 212" and the air output 216" such that when the valve 212" is in an open position, air may flow from the air input 210" through the valve 212", the system pressure sensor 214", and the air output 216" to the tubing system 130". When the valve 212" is closed, air may be blocked from flowing through the pressure tester 110". The default position of the valve 212" may be closed and it may be opened for testing purposes. The air output 216" may be connected to a connector 132" of the tubing system 130" when pressure testing of the tubing system 130" is performed for detecting leaks and or sealed connections. In some embodiments, the system 110" may not include the valve 212". For example, the system 110" without the valve 212" may be utilized for monitoring air filling and/or air pressure in an air fillable system.

The system pressure sensor 214" is a device that senses air pressure of the tubing system 130". For example, when the valve 212" is closed, the system pressure sensor 214" may sense tubing system 130" air pressure, generate a signal as a function of the air pressure, and transit the signal to the controller 220" via the communication interface 226". Various types of system pressure sensors may be utilized. For example, the system pressure sensor 214" may be an absolute pressure sensor that measures pressure relative to perfect vacuum, or a gage pressure sensor that measures pressure relative to atmospheric pressure. Although the pressure tester 110" is referred to as a pressure tester, in some embodiments, the pressure tester 110" may not include the pressure sensor 214". For example, the pressure tester 110" (i.e., system 110") without the system pressure sensor 214" may utilize the valve 212" for controlling the filling of a system under test such as the tubing system 130", such that the system 110" functions as a system fill device. The flow meter 234" and/or a measured amount of fill time may be utilized to determine when filling of the air fillable system 130" is complete.

The electronic processor 222" of the controller 220" may be communicatively coupled to the valve 212", the system pressure sensor 214", and the one or more ambient temperature sensors 230" via the communication interface 226". The electronic processor 222" also may be connected via the communication interface 226" to the atmospheric pressure sensor 232" (in embodiments that include the atmospheric pressure sensor 232"). In some embodiments, the pressure tester may include, or may be connected to the flow meter 234" to measure air flowing into, through, or out of the pressure tester 110". In some embodiments, the communication interface 226" may be configured to communicate via a network to a server or user interface. The network may include, for example, a wide area network ("WAN") (e.g., a TCP/IP based network), a local area network ("LAN"), a neighborhood area network ("NAN"), a home area network ("HAN"), or a personal area network ("PAN") employing any of a variety of communication protocols, such as Wi-Fi, Bluetooth, ZigBee, etc. In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

The memory 224" of the controller 220" is communicatively coupled to the electronic processor 222". The memory 224" may store a program and parameters for execution by the electronic processor 222" that configure the controller 220" to monitor sensor outputs and provide control signals to perform the pressure tests as described in more detail below. The program may produce a decision on whether the tubing system 130" is sealed or leaking and provide a level of confidence in the decision.

The user interface 228" includes one or more mechanisms that enable a user to interact with the tubing system pressure tester 110". For example, the user interface 228" may include one or more buttons, switches, and or keys for providing input to the tubing system pressure tester 110". In some embodiments, the user interface 228" includes a display screen, for example, a liquid crystal display (LCD) or organic light emitting diode (OLED) display for providing information of the tubing system pressure tester 110" to a user. For example, the display screen may provide pressure test analysis or results. See FIGS. 15 and 16 for examples of test analysis and test results respectively. In some embodiments, the display screen may include touch screen technology that allows a user to provide input to, control, or configure system parameters of the tubing system pressure tester 110". In some embodiments, the display screen may enable a user to input the type of system 130" under test (e.g., tubing, pipes, or other systems made of plastic, metal, or other types of materials). The user-input may be utilized by the controller 220" to manage air-flow control, a pressure test, and/or interpretation of test results.

The power source 240" may provide power to the controller 220", the valve 212", and the system pressure sensor 214". In some embodiments, the power source 240" may provide power to the atmospheric pressure sensor 232" and the ambient temperature sensor 230".

In some embodiments, the tubing system pressure tester 110" includes various connectors or fittings connected to the output of the valve 212", for example, the connector 242" and the T-connector 244". The T-connector 244" may be connected between the valve 212" and the output 216" to the tubing system under test. The T-connector 244" may provide an airway for exposing the pressurized air in the system 110" and/or the tubing system under test to the pressure sensor 214".

Figure 13:
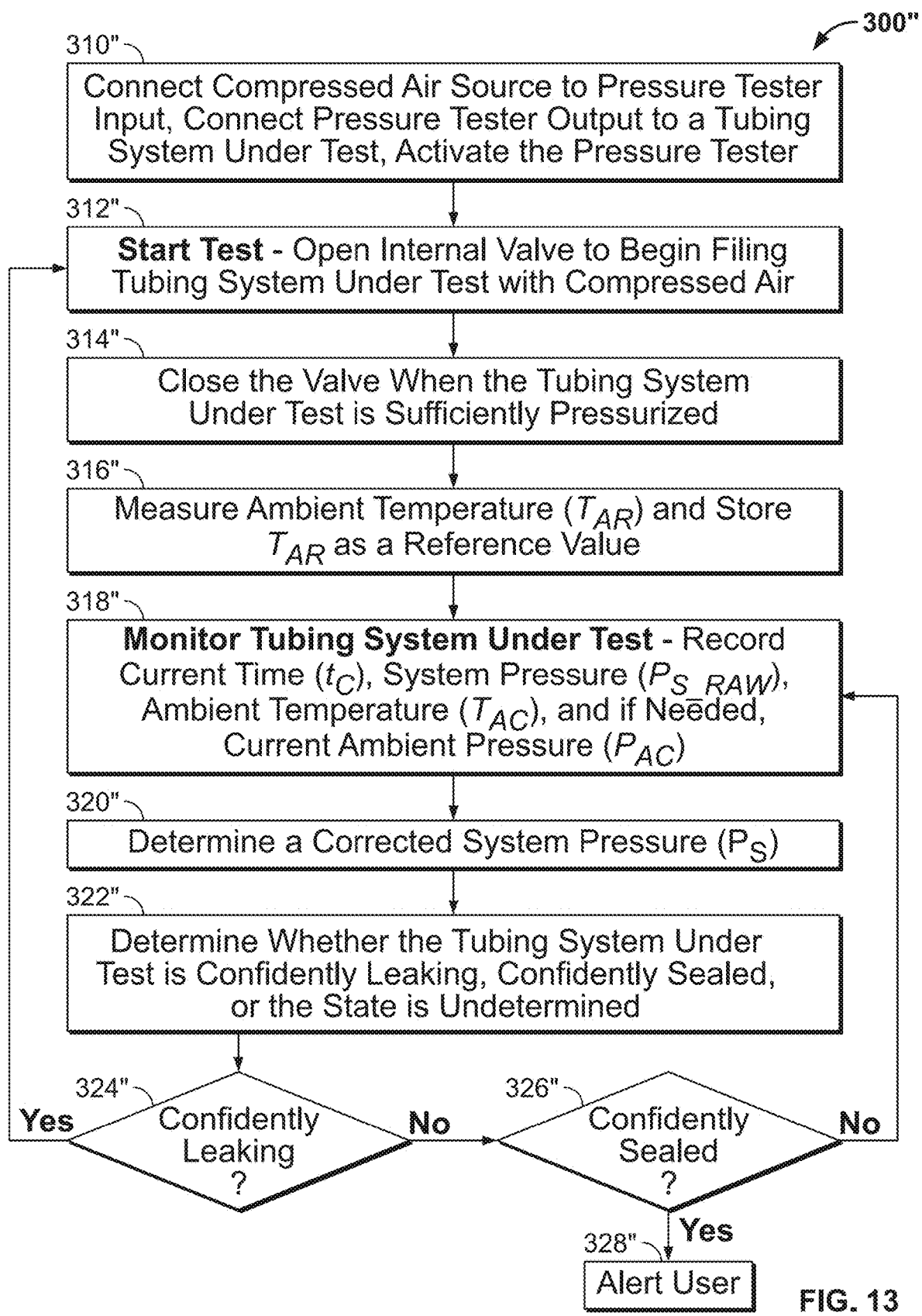
FIG. 13 is a flow chart illustrating a method for performing a tubing system pressure test to determine whether connections of a tubing system are sealed or leaking, in accordance with some embodiments.

FIG. 13 is a flow chart illustrating a method for performing a tubing system pressure test to determine whether connections of a tubing system are sealed or leaking. In step 310", the air compressor 120" is connected to the air input 210" of the tubing system pressure tester 110", and the air output 216" of the tubing system pressure tester 110" is connected to a tubing pipe connector 132" of the tubing system to provide air flow access into the tubing system 130". A user may then activate or power up the tubing system pressure tester 110" via the user interface 228".

In step 312", the valve 212" is opened, by the controller 220", and air flows from the air compressor 210" to begin filling the tubing system 130" with pressurized air via the air output 216". This process continues until the tubing system 130" is sufficiently pressurized, which can be determined by the controller 220" based on time reaching a time threshold, measured system pressure reaching a pressure threshold, or both. In step 314", when the tubing system 130" is sufficiently pressurized, the valve 212" is closed by the controller 220".

In step 316", the electronic processor 222" of the controller 220" receives an ambient temperature reading and stores this value as a reference value $T_{AR}$ for use in later calculations. The temperature value may be stored in any suitable units, but can be converted to an absolute temperature (relative to absolute zero) before use in the following calculations.

In step 318", the pressure tester 110" begins monitoring the tubing system 130" for sealed or leaking connections. The electronic processor 222" records the current time ($t_C$), the system pressure ($P_{S\_RAW}$) received from the system pressure sensor 214", and current ambient temperature ($T_{AC}$) from the one or more ambient temperature sensors 230". In some embodiments with a plurality of the ambient temperature sensors 230" (e.g., located at various locations along the tubing system under test), the average temperature sensed by the plurality of ambient temperature sensors 230" may be used as the current ambient temperature ($T_{AC}$). In embodiments where $P_{S\_RAW}$ is a gage pressure, a current ambient pressure ($P_{AC}$) is also recorded. The current time can be absolute or relative and can be stored in any suitable units.

In step 320", the electronic controller 220" determines a system pressure correction factor and determines the system pressure of the tubing system 130". In particular, a correction factor for measured system pressure $P_{S\_RAW}$ may be determined based on any change that occurs in the ambient temperature $T_{AC}$ after the closing of the valve 212". For example, in some embodiments, when $P_{S\_RAW}$ is a gage pressure, then system pressure $P_S$ is determined using the following equation:

$$P_S = \frac{P_{S\_RAW} + P_{AC}}{\frac{T_{AC}}{T_{AR}}} - P_{AC} \tag{1}$$

In some embodiments, when $P_{S\_RAW}$ is absolute pressure, then system pressure $P_S$ is determined using the following equation:

$$P_S = \frac{P_{S\_RAW}}{\frac{T_{AC}}{T_{AR}}} \tag{2}$$

In some embodiments, different equations are used to determine system pressure. For example, in some tubing systems having larger volumes (e.g., a volume above a particular threshold), further or alternative correction factors may be used. In some embodiments, for tubing systems having larger volumes, the electronic controller 220" implements a machine learning algorithm to calculate system pressure. For example, to implement the machine learning, the electronic controller 220" may receive similar sensor inputs as described in the flow chart 300" and provide the sensor inputs as input to a trained machine learning algorithm being executed by the electronic controller 220". Based on the input, the trained machine learning algorithm then outputs a system pressure estimate. In some embodiments, the machine learning algorithm is trained in advance, e.g., by a manufacturer, and then stored on the electronic controller 220" at the time of manufacture, and potentially updated via firmware updates to the electronic controller 220".

In step 322", the electronic processor 222" uses the system pressure ($P_S$) and current time ($t_C$) values to determine whether tubing system 130" being tested is confidently leaking, confidently sealed, or the state of the connections in the tubing system 130" is undetermined. See the description with respect to FIG. 14 below for an example of this decision making process.

In step 324", in instances when the electronic processor 222" confidently determines that the tubing system 130" is leaking, the method proceeds to step 312" to restart the test. In instances when the electronic processor 222" does not determine with confidence that the tubing system 130" is leaking, the method proceeds to step 326". At step 326", in instances when the electronic processor 222" confidently determines that the tubing system 130" is sealed, the method proceeds to step 328" and the system alerts the user that the tubing system 130" is sealed. The controller 220" may provide the alert via an audible, visual, or tactile indication provided via the user interface 228", or may wirelessly transmit an alert to a user device (e.g., mobile device such as a smart phone or laptop) which produces an audible visual, or tactile indication. At step 326", in instances when the electronic processor 222" does not confidently determine that the tubing system is sealed, the method proceeds to step 318" to continue monitoring the pressure in the tubing system 130". In some embodiments of the method 300", in step 322", the controller 220" provides an indication of the determination from that step, via the user interface 228" or wirelessly connected user device, to indicate whether the tubing system 130" was determined to be confidently leaking, confidently sealed, or uncertain (i.e., neither confidently leaking or confidently sealed).

Although one or more of the steps 310"-312" are described as being performed by the electronic controller 220" or the electronic processor 222", in some embodiments, some of these steps may be performed by a remote sever (i.e., a remote computing device) or another user device (see below).

Figure 14:
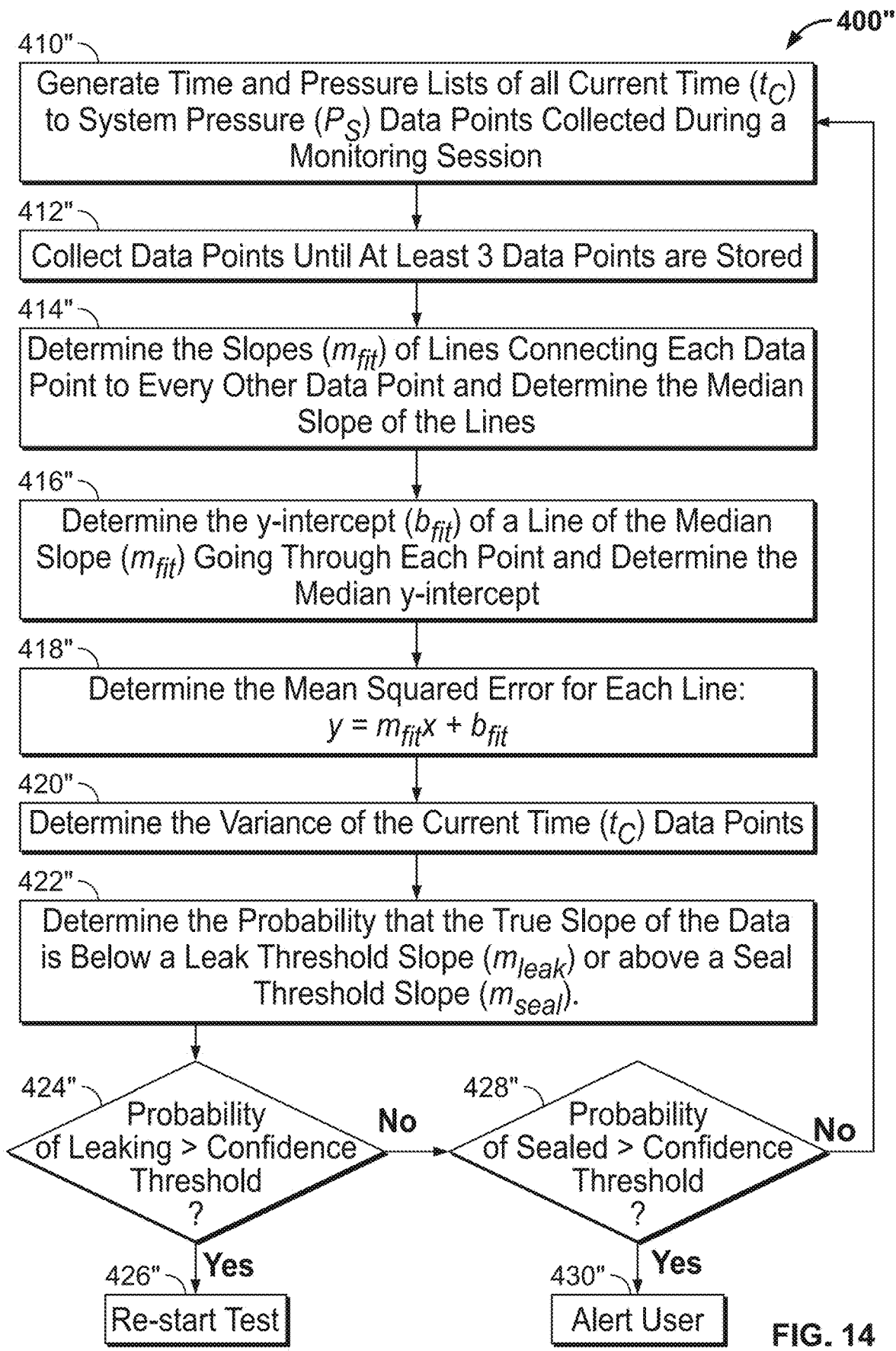
FIG. 14 is a flow chart illustrating a method for monitoring and detecting leaks during a tubing system pressure test, in accordance with some embodiments.

FIG. 14 is a flow chart illustrating a method for monitoring and detecting leaks during a tubing system pressure test. In general, there are many ways to analyze system pressure vs time data to determine whether the tubing system 130" is leaking or sealed. The example method described with respect to FIG. 14 utilizes robust regression, but other techniques or combinations of techniques such as a Kalman filter, confidence intervals, or various machine learning techniques are used in some embodiments and are also effective. In some embodiments, the chosen method produces a decision on whether the system is sealed or leaking and a level of confidence in the decision. Then, the method will continue to take in new data until the decision as to whether the system is leaking or sealed is made with a pre-defined level of confidence. The device may then take an action based on the confident decision.

In step 410", the electronic processor 222" generates lists of current time ($t_C$) and system pressure ($P_S$) data points collected during a monitoring session. The lists may be referred to as times and pressures respectively. In step 412", the electronic processor 222" collects data points until at least three data points are stored in the memory 224". When at least three data points have been collected. N is set to the number of data points:

$$N = \text{number of points} \tag{3}$$

In step 414", the electronic processor 222" determines the slopes ($m_{fit}$) of lines connecting each data point to every other data point and determines the median slope of the lines. For example, the median slope $m_{fit}$ may be determined as:

$$m_{fit} = \underset{\substack{i=1 \to N-1 \\ j=i+1 \to N}}{\text{median}} \left( \frac{P_j - P_i}{t_j - t_i} \right) \tag{4}$$

However, there are other methods or optimizations that may be utilized for determining the median slope.

In step 416", the electronic processor 222" determines the y-intercept ($b_{fit}$) of a line of the median slope ($m_{fit}$) going through each point and determines the median y-intercept as:

$$b_{fit} = \underset{i=1 \to N}{\text{median}}(P_i - m_{fit}t_i) \quad (5)$$

In step 418", the electronic processor 222" determines the mean squared error for each point:

$$y = m_{fit}x + b_{fit} \quad (6)$$

as:

$$E_{MS} = \frac{1}{N-2}\sum_{i=1}^{N}(P_i - (m_{fit}t_i + b_{fit}))^2 \quad (7)$$

In step 420", the electronic processor 222" determines the variance of the time ($t_C$) data points as:

$$S_{xx} = \sum_{i=1}^{N}t_i^2 - \frac{1}{N}\left(\sum_{i=1}^{N}t_i\right)^2 \quad (8)$$

In step 422", the electronic processor 222" determines the probability that the true slope of the data is below a leak threshold slope ($m_{leak}$) or above a seal threshold slope ($m_{seal}$) as:

$$P(\text{leak}) = \frac{1}{2}\left[1 + \text{erf}\left(\frac{m_{leak} - m_{fit}}{\sqrt{\frac{E_{MS}}{S_{xx}}}}\right)\right] \quad (9)$$

$$P(\text{seal}) = \frac{1}{2}\left[1 - \text{erf}\left(\frac{m_{seal} - m_{fit}}{\sqrt{\frac{E_{MS}}{S_{xx}}}}\right)\right] \quad (10)$$

In step 424", the method proceeds to 426" to restart the test (see step 312" of FIG. 13) in instances when the electronic processor 222" determines that the probability that the tubing system 130" is leaking (e.g., connections 132" are leaking) is greater than a predetermined confidence threshold ($C_T$) as:

$$P(\text{leak}) > C_T \to \text{LEAKING} \quad (11)$$

In step 424", in instances when the electronic processor 222" does not determine that the probability of leaking is greater than the predetermined confidence threshold ($C_T$), the method proceeds to step 428".

In step 428", the method proceeds to 430" to alert a user in instances when the electronic processor 222" determines that the probability that the tubing system 130" is sealed (e.g., connections 132" are sealed) is greater than a predetermined confidence threshold ($C_T$) as:

$$P(\text{seal}) > C_T \to \text{SEALED} \quad (12)$$

In step 428", in instances when the electronic processor 222" does not determine that the probability of a sealed tubing system 130" is greater than the predetermined confidence threshold ($C_T$), the method proceeds to step 410" (see step 318" of FIG. 13).

As noted above, rather than the technique described with respect to FIG. 14, in some embodiments, the electronic controller 220" implements a machine learning algorithm to determine whether the tubing system under test is confidently leaking, confidently sealed, or has an undetermined state (i.e., to perform block 322" of FIG. 13). For example, such a machine learning algorithm may be used in tubing systems having larger volumes. To implement, the electronic controller 220" may receive similar sensor inputs as described in the flow charts of 300" and 400", and provide the sensor inputs as input to a trained machine learning algorithm being executed by the electronic controller 220". Based on the inputs, the trained machine learning algorithm then outputs an indication of whether the tubing system under test is confidently leaking, confidently sealed, or has an undetermined state. In some embodiments, the machine learning algorithm is trained in advance, e.g., by a manufacturer, and then stored on the electronic controller 220" at the time of manufacture, and potentially updated via firmware updates to the electronic controller 220".

Although one or more of the steps 410"-430" are described as being performed by the electronic controller 220" or the electronic processor 222", in some embodiments, some of these steps may be performed by a remote sever (i.e., a remote computing device) or a another user device (see below).

Figure 15:
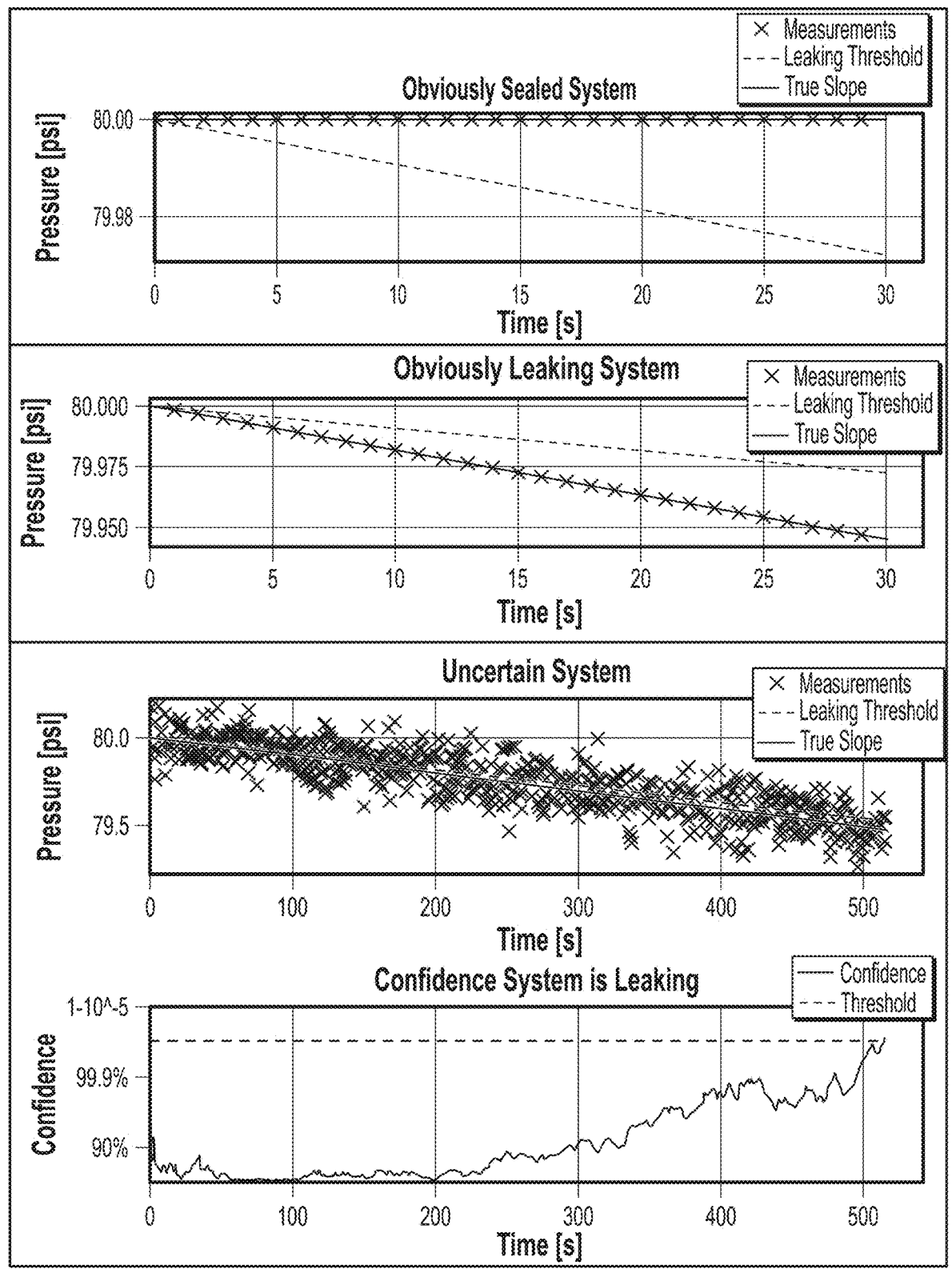
FIG. 15 illustrates plots of measured pressure vs time and confidence levels vs time that are used for determining whether a tubing system is leaking, sealed, or in an uncertain state, in accordance with some embodiments.

FIG. 15 includes example plots of measured pressure vs. time and confidence levels vs. time that are used for determining whether a tubing system 130" is leaking, sealed, or in an uncertain state. The method described with respect to FIG. 14 considers the system pressure vs time data and fits a line to the data using a robust regression. The slope of this line is an indicator of whether the system is sealed or leaking. Generally, a negative slope indicates that the pressure in the tubing system 130" is decreasing over time and the system is leaking, while a zero slope indicates that the pressure is staying the same over time and the system is sealed.

The method described with respect to FIG. 14 determines the slope of the line that is fit to the data points. Then, it is determined whether the probability that the true slope of the data points, given the actual observed pressure values, is below a predetermined leaking threshold slope. Also, the method determines the probability that the true slope is above a predetermined sealed threshold slope (which may be a non-zero, negative value), which may be the same or different from the leaking threshold slope.

The determined probabilities represent confidence levels as to whether the tubing system 130" is either leaking or sealed. The method continues to measure the pressures and analyze the data until it reaches a predetermined level of confidence in the decision, and then, in response, takes an appropriate action as described in FIGS. 13 and 14.

Figure 16:
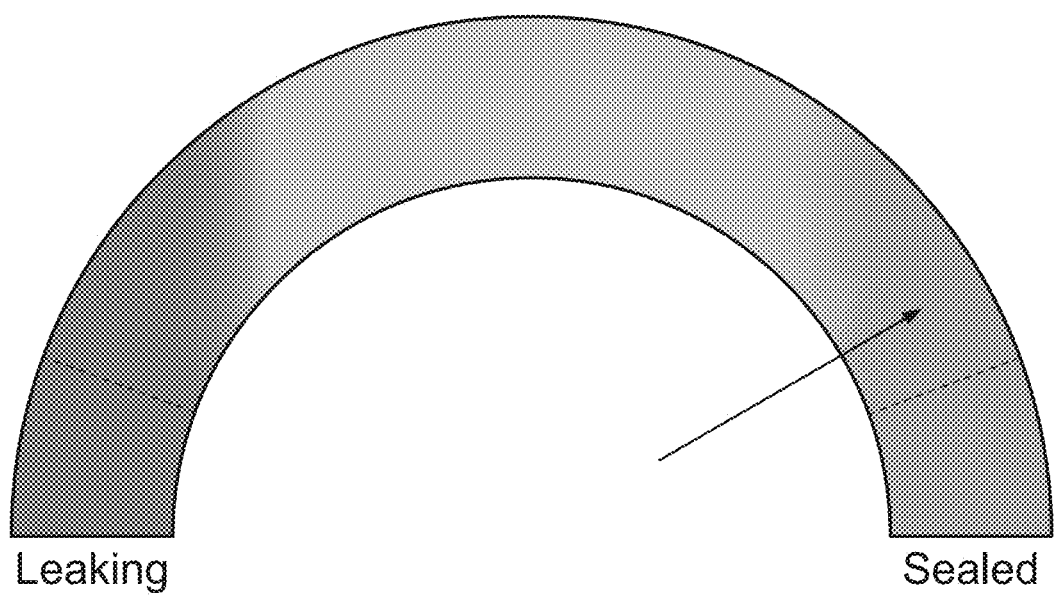
FIG. 16 illustrates an example test results display in a user interface of the tubing system pressure tester, in accordance with some embodiments.

FIG. 16 illustrates an example test results display in a user interface of the tubing system pressure tester. The test results display shown in FIG. 16 may be generated by the electronic processor 222" and displayed via the user interface 228" (e.g., as part of step 322" of FIG. 13). The test results display indicates when the pressure tester 110" detects leaks in the tubing system 130" or determines that the connectors 132" of the tubing system 130" are sealed. In some embodiments, the test results display an indication of whether the tubing system 130" is sealed or leaking and a confidence level of the indication. For example, as illustrated, the further clockwise the arrow of FIG. 16, the more confident the indication from the controller 220" that the tubing system 130" is sealed (and not leaking); and the further counterclockwise the arrow of FIG. 16, the less confident the indication from the controller 220" that the tubing system 130" is sealed.

Similarly, the further clockwise the arrow of FIG. 16, the less confident the indication from the controller 220" that the tubing system 130" is leaking; and the further counterclockwise the arrow of FIG. 16, the more confident the indication from the controller 220" that the tubing system 130" is leaking (and not sealed). In some embodiments, the controller provides other visual, audible, or tactile indications and associated confidence levels than the test results display that is shown in FIG. 16.

Figure 17:
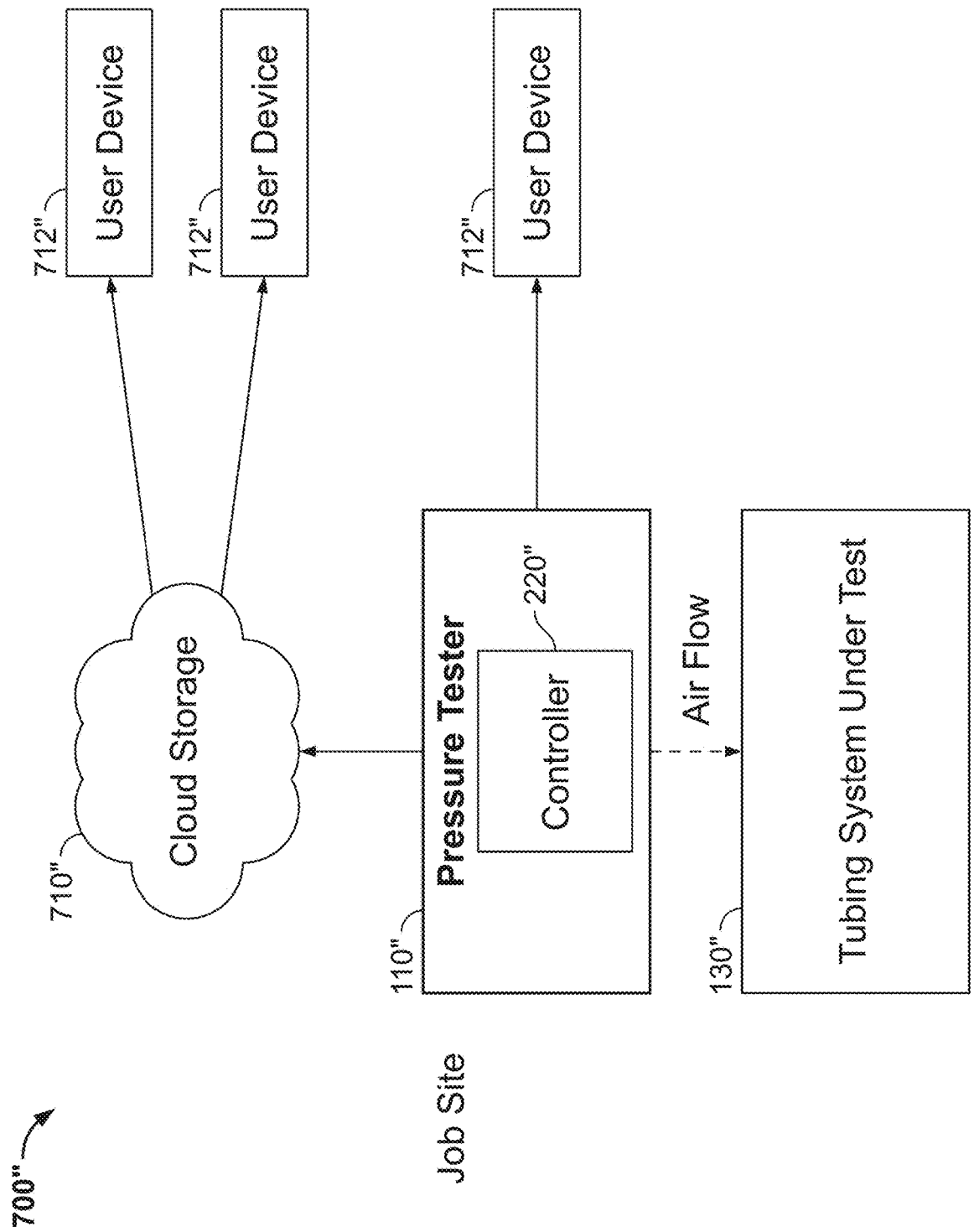
FIG. 17 is a block diagram of a pressure testing system including remote devices in communication with a pressure tester, in accordance with some embodiments.

FIG. 17 is a diagram of a pressure testing system 700" including remote devices in communication with a pressure tester. The pressure testing system 700" includes the pressure tester 110", the tubing system under test 130", the controller 220", a cloud system 710", and one or more user devices 712".

The cloud system 710" may include one or more servers or computing devices and one or more storage devices. The controller 220" may communicate with a server or storage device in the cloud system 710" via the communication interface 226". In some embodiments, one or more servers in the cloud system 710" may include one or more processors and memory for analyzing output data from the pressure sensor 110" for a pressure test of a tubing system. In some embodiments, the one or more servers may be configured to generate a web application that can be rendered by a browser on the one or more user devices 712". Alternatively, the server may transmit the output data, or analyzed output data, to a user device 712" for rendering in a graphical user interface. In some embodiments, a server in the cloud system 710" may be configured to receive notification that a pressure test has completed from the pressure tester 110", determine whether the pressure test passed or failed based on user provided parameters, compile reports of the pressure test results, and automatically transmit the reports to the one or more user devices 710". The reports of the pressure test results may be requested and/or defined by a user.

The one or more user devices 712" may include any suitable device for receiving output data from the pressure sensor and presenting the output data via a user interface. The one or more user devices 712" may include, for example, a smart phone, a laptop, and/or another type of computer system. The user devices 712" may include one or more communication interfaces for wired or wireless communication with a server in the cloud system 710" via a network such as the Internet, or directly with the pressure tester 110". In some embodiments, the one or more user devices 712" may include one or more processors and memory configured for analyzing the out-put data from the pressure tester 110" and providing the results in a user interface. In some embodiments, the one or more user devices 712" may execute an application for rendering pressure tester output data in a graphical user interface (GUI) or web browser. The one or more user devices 712" enable a user to access results from off-site of the pressure tester 110" in real-time or at a later time to notify users of pressure test results. The one or more user devices 712" may be utilized by various individuals or professionals such as a plumber, a general contractor, a plumbing inspector, a property owner, or any other interested party. The cloud system 710" may send notifications to multiple users on a multiple user devices 712". In some embodiments, the one or more user devices 712" display a graphical user interface that enables a user to select pressure testing parameters and transmit parameters (e.g., via the Internet) to the system 100" to configure and/or run pressure testing. For example, an inspector may remotely specify or select parameters that are sent to the system 100" by a user device 712" for configuring and/or running pressure testing.

In some embodiments, the controller 220" uploads output data from the pressure tester 110" to the cloud system 710" via the communication interface 226". The cloud system 710" may store the output data and/or transmit the output data to the one or more user devices 712". In some embodiments, the controller 220" communicates directly to the one or more user devices 712" via the communication interface 226". For example, the output data may be communicated via a Bluetooth or Wi-Fi link or via a wired connection. The data may be transmitted from the controller 220" to the cloud system 710" and/or the one or more user devices 712" while a test is progressing, or after one or more pressure tests have completed. For example, the controller 220" may store the output data from the pressure tester in the memory 224" until the data is retrieved by a server in the cloud system 710" or by the one or more user devices 712". Alternatively or in addition, or the controller 220" may push the output data at a specified time or in response to a condition in the pressure tester system. In some embodiments, the controller may transmit notification that a pressure test has completed to a server in the cloud system 710".

Figure 18:
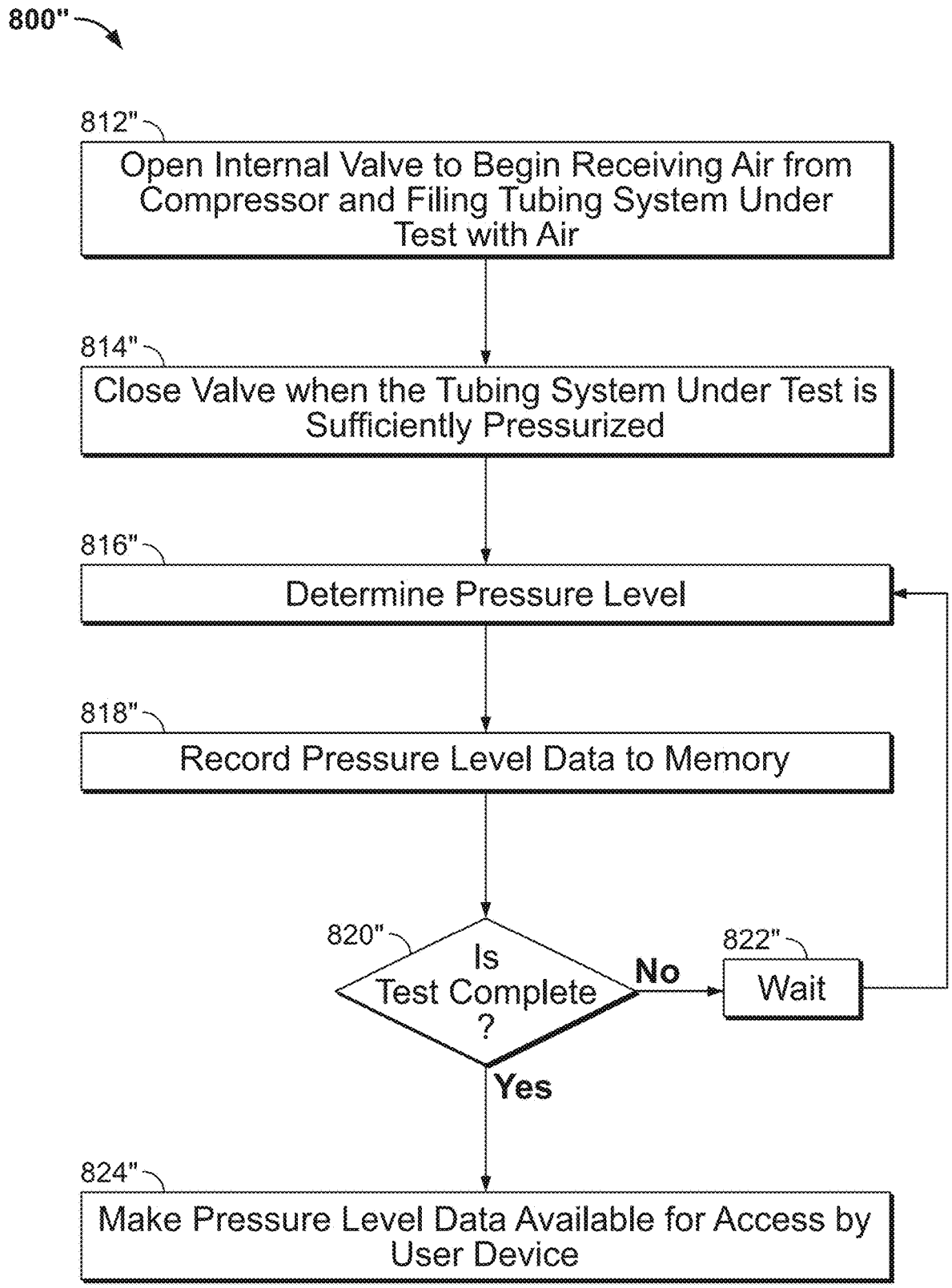
FIG. 18. is a flow chart illustrating a method for storing and retrieving pressure test results for any type of piping including pipes made of metal, plastic, or other materials, in accordance with some embodiments.

FIG. 18 is a flow chart illustrating a method 800" for storing and retrieving pressure test results. In step 812", the electronic controller 220" opens the valve 212" to begin receiving air from compressor via the air input 210" and filling the tubing system 130" with air.

In step 814", the electronic controller 220" closes the valve 212" when the tubing system 130" under test is sufficiently pressurized. For example, the electronic controller 220" closes the valve after a predetermined amount of time elapses or when the pressure of the system 130" exceeds a threshold as determined by the electronic controller 220" by comparing output from the system pressure sensor 214" with the threshold.

In step 816", the electronic controller 220" determines a pressure level for the tubing system 130". For example, as described above, the pressure of the system 130" may be determined based on output from the system pressure sensor 214", the ambient temperature sensor 230", the atmospheric pressure sensor 232", and/or time.

In step 818", the electronic controller 220" records the pressure level data to the memory 224".

In step 820", the electronic controller 220" determines whether the test of the system 130" is complete. For example, the electronic controller 220" may determine that the test is complete in response to a predetermined amount of time elapsing since the completion of step 814", or in response to a detected fault. In step 820", when the test is not complete, the system proceeds to step 822" and waits for a specified time period (e.g., 100 milliseconds, 1 second, 10 seconds, 1 minute, 5 minutes, 10 minutes, etc.), and then proceeds back to step 816" after the specified time period.

In step 820", when the test is complete, the system proceeds to step 824". In step 824" the electronic controller 220" makes pressure level data available for access by user device. For example, the controller 220" transmits the pressure test results to the cloud system 710" and/or one or more user devices 712". The receiving user device 712" may, in turn, may analyze and/or display the pressure test results in a graphical user interface of the user device 712". Analysis of the pressure level data may be performed by the controller 220" or an external computing device such as a computing device in the cloud system 710" or the one or more user devices 712".

Figure 19:
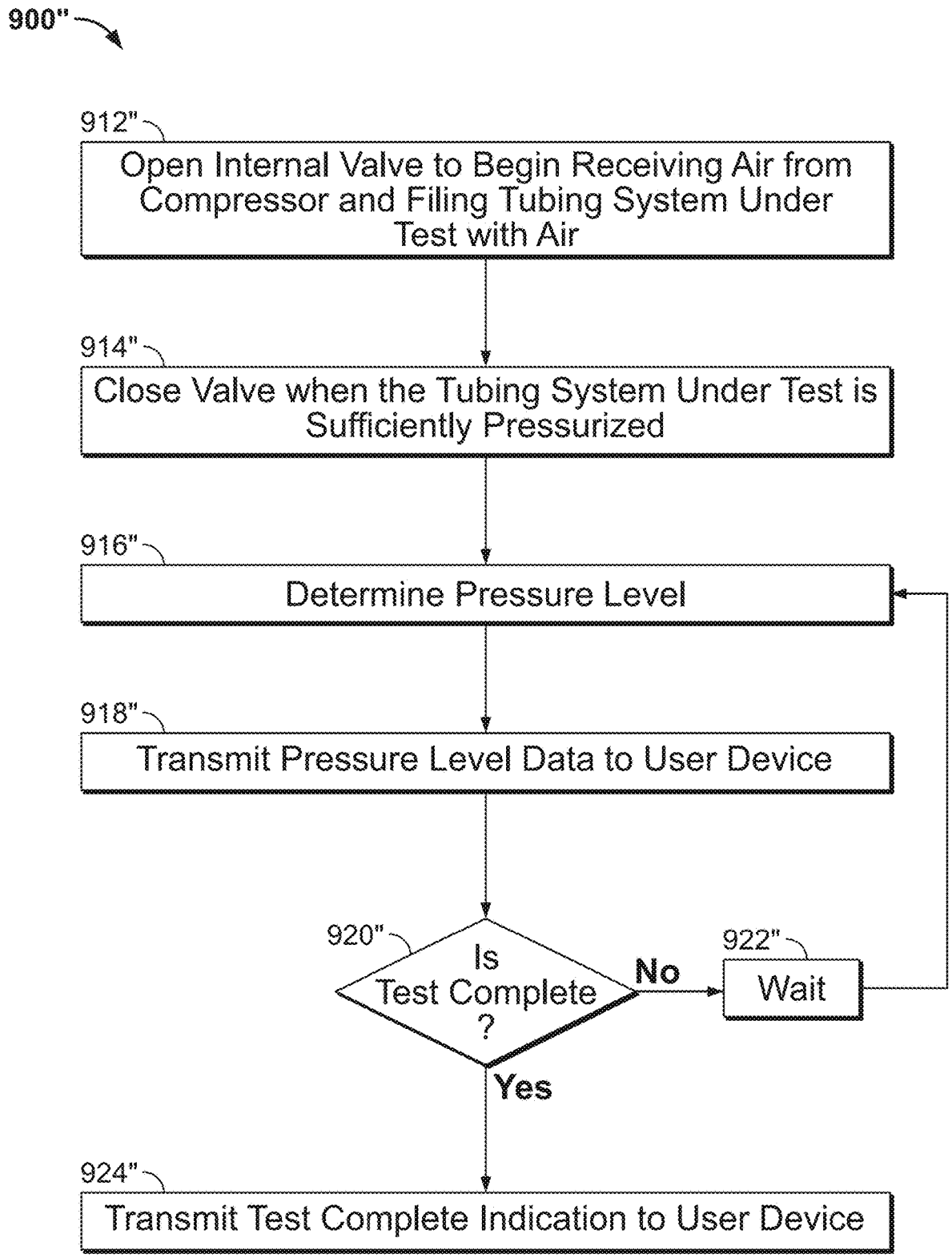
FIG. 19 is a flow chart illustrating a method for communicating pressure test results to external devices, in accordance with some embodiments.

FIG. 19 is a flow chart illustrating a method 900" for communicating pressure test results to external devices, in accordance with some embodiments. In step 912", the electronic controller 220" opens the valve 212" to begin receiving air from compressor via the air input 210" and filling the tubing system 130" with air.

In step 914", the electronic controller 220" closes the valve 212" when the tubing system 130" under test is sufficiently pressurized. For example, the electronic controller 220" closes the valve after a predetermined amount of time elapses or when the pressure of the system 130" exceeds a threshold as determined by the electronic controller 220" by comparing output from the system pressure sensor 214" with the threshold.

In step 916", the electronic controller 220" determines a pressure level for the tubing system 130" (e.g., pressure test results). For example, as described above, the system 130" pressure may be determined based on output from the system pressure sensor 214", the ambient temperature sensor 230", the atmospheric pressure sensor 232", and/or time.

In step 918", the electronic controller 220" transmits pressure level data to a user device. For example, the electronic controller 220" may transmit the pressure test results to the cloud system 710". The cloud system 710" may store the pressure level data and/or transmit the pressure level data to one or more of the user devices 712" for display on a user interface of the user devices 712". Alternatively, the pressure tester 110" may transmit the pressure level data directly to the one or more user devices 712" for display of the pressure level data.

In step 920", the electronic controller 220" determines whether the test of the system 130" is complete. For example, the electronic controller 220" may determine that the test is complete in response to a predetermined amount of time elapsing since the completion of step 914", or in response to a detected fault. In step 920", when the pressure test is not complete, the electronic controller 220" proceeds to step 922". In step 922", similar to step 822", the electronic controller 220" waits a specified time period and then proceeds to step 916".

In step 920", when the pressure test is complete, the system proceeds to step 924". In step 924", the electronic controller 220" transmits a test complete indication to a user device. For example, a test completion notification may be sent to the one or more user devices 712" via a server in the cloud system 710", or it may be transmitted directly from the communication interface 226" to the one or more user devices 712". The pressure test completion notification may also include results of the pressure test, such as pressure level data. In some embodiments the test complete notification may be stored in the cloud system 710" with or without the pressure test results. The user device 712" receiving the notification may, in turn, provide a human perceptible notification. For example, the user device 712" may provide the notification as a visual notification on a graphical user interface of the user device 712", an audio notification generated by a speaker of the user device 712", a tactile notification generated by a vibrating element of the user device 712", or a combination thereof. Analysis of the pressure level data may be performed by the controller 220" or an external computing device such as a computing device in the cloud system 710" or the one or more user devices 712".

Figure 20:
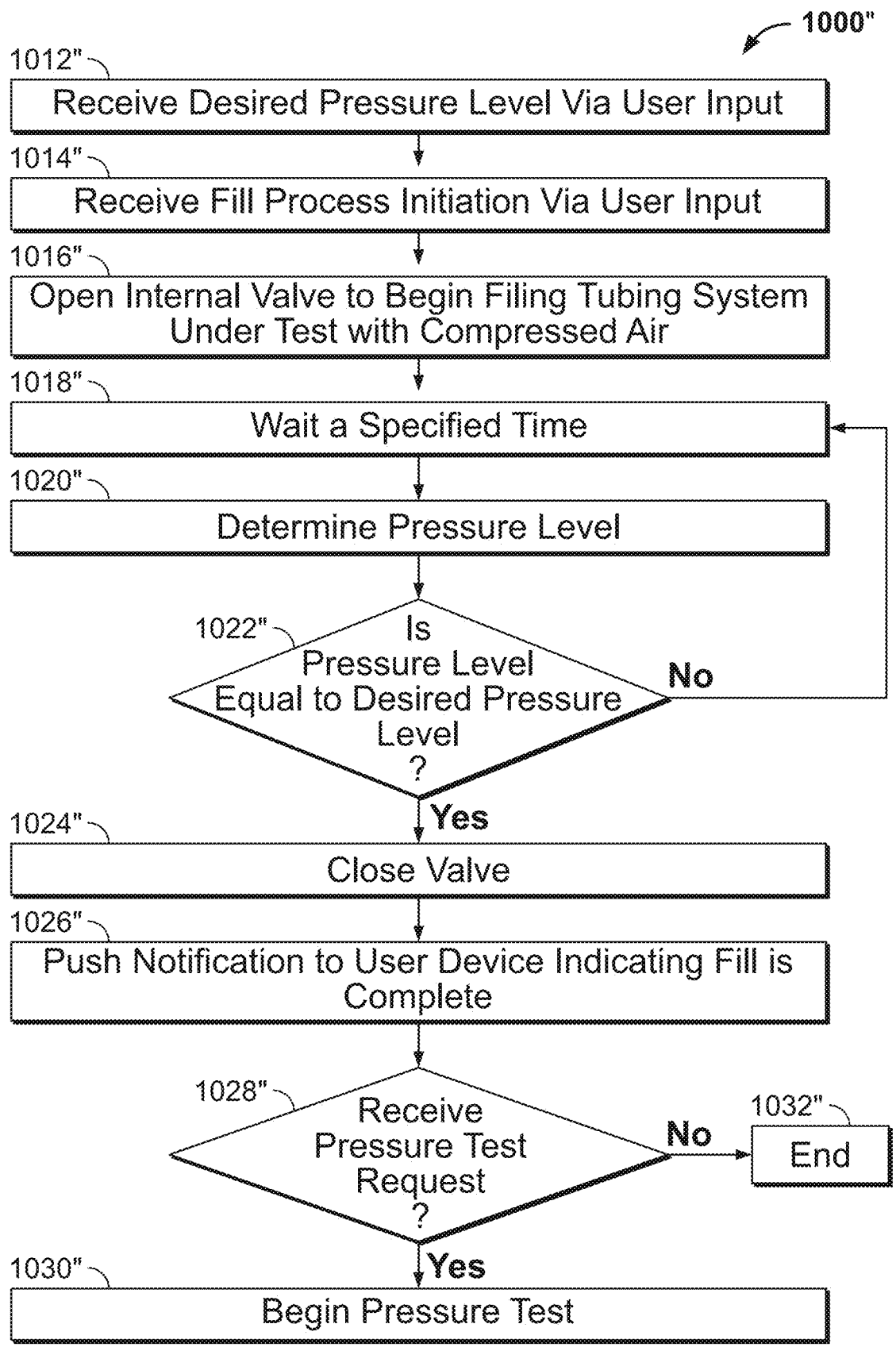
FIG. 20 is a flow chart illustrating a method for automatic fill of a tubing system for measuring pressure, in accordance with some embodiments.

FIG. 20 is a flow chart illustrating a method 1000" for automatic fill of a tubing system for measuring pressure in the tubing system, in accordance with some embodiments. In step 1012", the electronic controller 220" receives a target pressure level parameter indicating a pressure level or pressure level threshold for filling the pressure sensor 110" and the tubing system 130" to a desired air pressure. The target pressure level parameter may be received via the user interface 228" based on user input. Alternatively the target pressure level parameter may be received via the communication interface 226" from the one or more user devices 712", or from a server in the cloud system 710". In some embodiments, pressure level parameters and other parameters for conducting pressure level testing are set based on local construction codes.

In step 1014", electronic controller 220" receives a fill process initiation signal via the user interface 228" based on user input, or via the communication interface 226" (similar to step 1012"). For example, the fill process initiation signal may be received based on a soft or hard key button press on the pressure tester 110" or user device 712".

In step 1016", the electronic controller 220" transmits a signal to the valve 212" to open the valve 212" to begin filling the pressure tester 110" and the tubing system 130", via the input 210", with air from an air compressor connected to the input 210". The air in the pressure tester 110" is exposed to the pressure sensor 214".

In step 1018", the electronic controller 220" waits a specified amount of time while the air is received into the pressure tester 110". In some embodiments, step 1018" is bypassed and the electronic controller 220" proceeds to step 1020" without waiting a specified amount of time.

In step 1020", the electronic controller 220" receives an output signal from the system pressure sensor 214" and/or one or more other sensors, such as the ambient temperature sensor 230" and the atmospheric pressure sensor 232". The electronic controller 220" determines a pressure level of the system 130" based on the output signals of the system pressure sensor 214" and/or the one or more other sensors, as described above.

In step 1022", the electronic controller 220" determines whether the pressure level has reached a desired pressure threshold level. When the electronic controller 220" determines that the pressure level fails to reach the threshold that is based on the target pressure level parameter, the controller 220" proceeds to step 1018". When the electronic controller 220" determines that the pressure level succeeds in reaching the threshold that is based on the target pressure level parameter, the controller 220" proceeds to step 1024".

In step 1024", the electronic controller 220" closes the valve 212". At this point, the pressure tester 110" and the tubing system 130" are pressurized to a desired level.

In step 1026", the electronic controller 220" communicates to the one or more user devices 710" indicating that the fill process is complete. The communication may be sent via the cloud system 710" or directly to the user devices 712", similar to the previously described notifications to provide an audible, visual, or tactile indication, or a combination thereof.

In step 1028", the electronic controller 220" determines whether a request for conducting a pressure test has been received by the electronic controller 220". When the electronic controller 220" receives a request for conducting a pressure test, the controller 220" proceeds to step 1030" and begins a test to determine the pressure in the pressure sensor 110" and the tubing system 130". The test may then be conducted according to above-described techniques.

In step 1028", when the electronic controller 220" does not receive a request for conducting a pressure test, the controller 220" proceeds to the end step 1032", where the electronic controller may open the valve 212" to release the pressurized air in the system, loop back to again execute block 1028", or wait for a further command.

Figure 21:
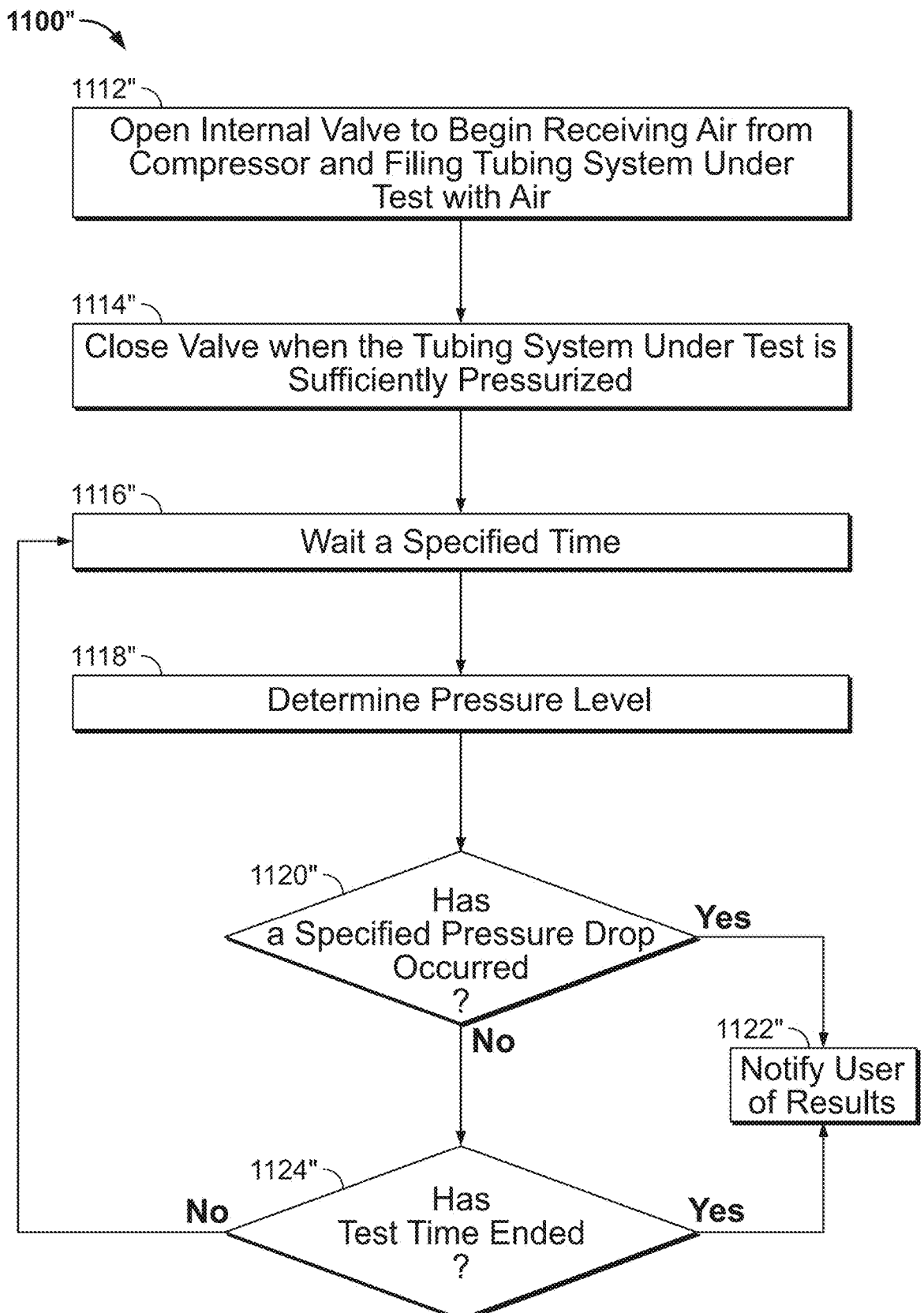
FIG. 21 is a flow chart illustrating a method for immediate large leak detection in a tubing system, in accordance with some embodiments.

FIG. 21 is a flow chart illustrating a method 1100" for immediate large leak detection in a tubing system, in accordance with some embodiments. In step 1112", the electronic controller 220" opens the valve 212" to begin receiving air from an air compressor via the input 210" and filling pressure tester 110" and the tubing system 130" with air.

In step 1114", when the pressure tester 110" and the tubing system 130" are pressurized to a desired air pressure level, the electronic controller 220" closes the valve 212". For example, the electronic controller 220" closes the valve after a predetermined amount of time elapses or when the pressure of the system 130" exceeds a threshold as determined by the electronic controller 220" by comparing output from the system pressure sensor 214" with the threshold. The desired pressure level and predetermined amount of time may be configured in the pressure tester 110" via the user interface 228" or via the communication interface 226".

In step 1116", the electronic controller 220" waits for a specified time. The time may be configured in the pressure tester 110" via the user interface 228" or via the communication interface 226". In some embodiments, step 1116" is bypassed and the electronic controller 220" proceeds to step 1118" without waiting a specified amount of time.

In step 1118", the electronic controller 220" receives an output signal from the system pressure sensor 214" and/or one or more other sensors, such as the ambient temperature sensor 230" and the atmospheric pressure sensor 232". The electronic controller 220" determines a pressure level based on the output signals of the system pressure sensor 214" and/or the one or more other sensors. In some embodiments, the controller 220" may transmit information based on the output signals of the system pressure sensor 214" to a remote computing device for analysis and to determine the pressure level.

In step 1120", the electronic controller 220" determines whether a specified pressure drop has occurred. When the electronic controller 220" determines that a specified air pressure drop has occurred based on the measured pressure level, the controller 220" proceeds to step 1122" and transmits a notification to the one or more user devices 712" directly or via the cloud system 710". The parameters for the specified pressure drop may be configured in the controller 220" and/or the memory 224" via the user interface 228" or via the communication interface 226" from the one or more user devices 712". In some embodiments, the loss of air pressure according to the specified pressure drop over the specified wait time may indicate that the tubing system 130" is rapidly losing air pressure.

In step 1120", when the electronic controller 220" determines that a specified pressure drop has not occurred based on the measured pressure level, the controller 220" proceeds to step 1124".

In step 1124", the electronic controller 220" determines whether the time for conducting the pressure test has ended. When the electronic controller 220" determines that the time for conducting the pressure test has ended, the controller 220" proceeds to step 1122", and in step 1122", transmits a notification to the one or more user devices 712" directly or via the cloud system 710". As previously described, the user device 712" may provide the notification to the user visually, audibly, tactilely, or a combination thereof.

In some embodiments a user may input configuration parameters and/or receive indications of the test status and/or test results of the above methods via the user interface 228".

The various methods as illustrated in the figures and described herein represent example embodiments of methods. The methods may be implemented in software, hardware, or a combination thereof. The order of method may be changed, and various elements may be added, reordered, combined, omitted, modified, etc.

Various features and aspects of the present invention are set forth in the following claims.

What is claimed is:

1. A working element operable to expand an end of a tube, the working element comprising:
a main body configured to rotate about an axis;
a plurality of roller supports pivotally coupled to the main body, the roller supports movable relative to the main body between a retracted position and an expanded position; and
a plurality of rollers coupled to the roller supports such that a distance between a first roller of the plurality of rollers and a second roller of the plurality of rollers increases when the roller supports move toward the expanded position,
wherein the plurality of rollers is configured to be inserted into the end of the tube when the roller supports are in the retracted position, and
wherein the plurality of rollers is engageable with an inner circumference of the tube when the main body rotates about the axis to expand the end of the tube,
wherein each roller of the plurality of rollers is oriented along a roller axis and the roller axis of each roller of the plurality of rollers extends parallel to the axis of the main body with the plurality of roller supports in the retracted position and the expanded position.

2. The working element of claim 1, wherein the plurality of roller supports is movable toward the expanded position in response to rotation of the main body about the axis.

3. The working element of claim 1, wherein the main body is configured to rotate about the axis at an angular speed between 10,000 RPM and 25,000 RPM.

4. A working element operable to expand an end of a tube, the working element comprising:
a drive shaft;
a main body coupled for co-rotation with the drive shaft;
a plurality of arms movably coupled to the main body, the arms configured to move from a retracted position toward an expanded position due to inertia in response to rotation of the drive shaft and the main body; and
a plurality of rollers supported by the arms,
wherein the plurality of rollers is engageable with an inner circumference of the tube to expand the end of the tube via centrifugal force as the arms move toward the expanded position.

5. The working element of claim 4, wherein each of the arms includes a first end coupled to the main body and a second end supporting at least one roller of the plurality of rollers.

6. The working element of claim 5, wherein each of the arms has a curved shape.

7. The working element of claim 4, wherein the drive shaft extends from the main body in a first direction, and wherein the working element further comprises a central shaft extending from the main body in a second direction opposite the first direction.

8. The working element of claim 7, further comprising a guide roller rotatably coupled to the central shaft.

9. The working element of claim 8, wherein the guide roller is configured to be inserted into the end of the tube to at least partially support the working element during an expansion operation.

10. The working element of claim 4, wherein the drive shaft is configured to be rotatably driven at an angular speed between 10,000 RPM and 25,000 RPM when the plurality of rollers is engaged with the inner circumference of the tube.

11. The working element of claim 10, wherein the angular speed is about 18,000 RPM.

12. The working element of claim 4, further comprising a plate disposed between an end of the drive shaft and the main body, wherein the drive shaft is rotatable relative to the plate.

13. A working element operable to expand an end of a tube, the working element comprising:
a main body;
a first support and a second support movably coupled to the main body for movement between a retracted position and an expanded position;
a mandrel engageable with the first support and the second support to move the first support and the second support toward the expanded position;
a first roller coupled to the first support; and
a second roller coupled to the second support,
wherein the first roller and the second roller are configured to be inserted into the end of the tube when the first and second supports are in the retracted position,
wherein the first support and the second support are movable to the expanded position in response to translation of the mandrel while the first roller and the second roller are inserted into the end of the tube to engage the first roller and the second roller with an inner circumference of the tube, and
wherein the mandrel is coupled for co-rotation with the main body, and
wherein the mandrel and the main body are configured to rotate when the first roller and the second roller are engaged with the inner circumference of the tube to expand the end of the tube,
wherein the main body includes a non-circular opening, and wherein the mandrel extends through the non-circular opening to couple the mandrel and the main body for co-rotation.

14. The working element of claim 13, wherein the first support and the second support are biased toward the retracted position.

15. The working element of claim 13, wherein the first support and the second support are slidably coupled to the main body.

16. The working element of claim 13, wherein the main body is configured to rotate about an axis, and wherein the first support and the second support are movable between the expanded position and the retracted position in directions transverse to the axis.

17. The working element of claim 13, wherein the main body, the first support, and the second support are shaped as a cylinder when the first support and the second support are in the retracted position.

18. The working element of claim 13, further comprising a resilient ring configured to bias the first support and the second support toward the retracted position.

* * * * *